(12) United States Patent
Takami et al.

(10) Patent No.: US 11,251,414 B2
(45) Date of Patent: Feb. 15, 2022

(54) ELECTRODE GROUP, SECONDARY BATTERY, BATTERY PACK, AND VEHICLE

(71) Applicant: KABUSHIKI KAISHA TOSHIBA, Minato-ku (JP)

(72) Inventors: Norio Takami, Yokohama (JP);
Kazuomi Yoshima, Yokohama (JP);
Takuya Iwasaki, Uenohara (JP);
Tomoko Sugizaki, Kawasaki (JP);
Tomoe Kusama, Kawasaki (JP);
Yasuhiro Harada, Isehara (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 0 days.

(21) Appl. No.: 15/913,021

(22) Filed: Mar. 6, 2018

(65) Prior Publication Data
US 2019/0088926 A1 Mar. 21, 2019

(30) Foreign Application Priority Data
Sep. 19, 2017 (JP) .............................. JP2017-178798

(51) Int. Cl.
*H01M 4/131* (2010.01)
*H01M 50/429* (2021.01)
*H01M 50/44* (2021.01)
*H01M 50/446* (2021.01)
*H01M 50/46* (2021.01)
(Continued)

(52) U.S. Cl.
CPC ....... *H01M 4/131* (2013.01); *H01M 10/0525* (2013.01); *H01M 10/44* (2013.01); *H01M 50/4295* (2021.01); *H01M 50/44* (2021.01); *H01M 50/446* (2021.01); *H01M 50/449* (2021.01); *H01M 50/46* (2021.01); *H01M 4/485* (2013.01); *H01M 10/056* (2013.01); *H01M 2004/027* (2013.01); *H01M 2220/20* (2013.01)

(58) Field of Classification Search
CPC ..................................................... H01M 4/131
See application file for complete search history.

(56) References Cited

U.S. PATENT DOCUMENTS 7,279,251 B1 10/2007 Yun et al.
8,771,879 B2 7/2014 Gordon et al.
(Continued)

FOREIGN PATENT DOCUMENTS

| CN | 1610170 | 4/2005 |
|---|---|---|
| CN | 107004808 | 8/2017 |

(Continued)

*Primary Examiner* — Brian R Ohara
(74) *Attorney, Agent, or Firm* — Oblon, McClelland, Maier & Neustadt, L.L.P.

(57) ABSTRACT

According to one embodiment, an electrode group includes a positive electrode active material-containing layer, a negative electrode active material-containing layer, a lithium ion conductive layer, and a porous layer. The lithium ion conductive layer includes lithium-containing inorganic particles. The lithium ion conductive layer covers at least part of the positive electrode active material-containing layer. The porous layer covers at least part of the negative electrode active material-containing layer. The positive electrode active material-containing layer and the negative electrode active material-containing layer face each other via the lithium ion conductive layer and the porous layer.

19 Claims, 8 Drawing Sheets

(51) Int. Cl.
  *H01M 10/0525* (2010.01)
  *H01M 50/449* (2021.01)
  *H01M 10/44* (2006.01)
  *H01M 4/485* (2010.01)
  *H01M 4/02* (2006.01)
  *H01M 10/056* (2010.01)

(56) References Cited

U.S. PATENT DOCUMENTS

| | | | |
|---|---|---|---|
| 2004/0214089 A1 | 10/2004 | Lee et al. | |
| 2005/0208383 A1* | 9/2005 | Totsuka | H01M 2/162 |
| | | | 429/247 |
| 2006/0216600 A1 | 9/2006 | Inagaki et al. | |
| 2007/0231693 A1* | 10/2007 | Inagaki | H01M 4/485 |
| | | | 429/231.1 |
| 2008/0305389 A1* | 12/2008 | Arora | H01M 10/345 |
| | | | 429/145 |
| 2009/0087728 A1* | 4/2009 | Less | H01M 2/166 |
| | | | 429/129 |
| 2009/0197181 A1* | 8/2009 | Sakitani | H01M 4/131 |
| | | | 429/305 |
| 2010/0252426 A1* | 10/2010 | Tsukuda | H01M 2/162 |
| | | | 427/340 |
| 2011/0045168 A1 | 2/2011 | Seo et al. | |
| 2011/0081583 A1* | 4/2011 | Sugimoto | H01M 2/145 |
| | | | 429/346 |
| 2012/0183836 A1 | 7/2012 | Harada et al. | |
| 2013/0101886 A1* | 4/2013 | Jung | H01M 4/366 |
| | | | 429/144 |
| 2013/0183568 A1 | 7/2013 | Babinec et al. | |
| 2013/0244082 A1 | 9/2013 | Lee et al. | |
| 2014/0023933 A1 | 1/2014 | Chiga et al. | |
| 2014/0342237 A1* | 11/2014 | Kim | H01M 2/145 |
| | | | 429/247 |
| 2014/0377612 A1 | 12/2014 | Kwon et al. | |
| 2016/0204406 A1* | 7/2016 | Ryu | H01M 50/449 |
| | | | 429/144 |
| 2016/0322621 A1 | 11/2016 | Umeyama et al. | |
| 2017/0077510 A1 | 3/2017 | Zhang et al. | |
| 2017/0077547 A1 | 3/2017 | Takami et al. | |
| 2017/0309915 A1 | 10/2017 | Lee et al. | |

FOREIGN PATENT DOCUMENTS

| | | |
|---|---|---|
| EP | 3 190 652 | 7/2017 |
| JP | 2002-15772 | 1/2002 |
| JP | 2003-533862 | 11/2003 |
| JP | 5110565 | 12/2012 |
| JP | 5834322 | 12/2015 |
| JP | 5938523 | 6/2016 |
| JP | 6020892 | 11/2016 |
| JP | 2017-59536 | 3/2017 |
| WO | WO 2011/013254 A1 | 2/2011 |
| WO | WO2012-132934 | 10/2012 |
| WO | WO 2014/032796 | 3/2014 |

* cited by examiner

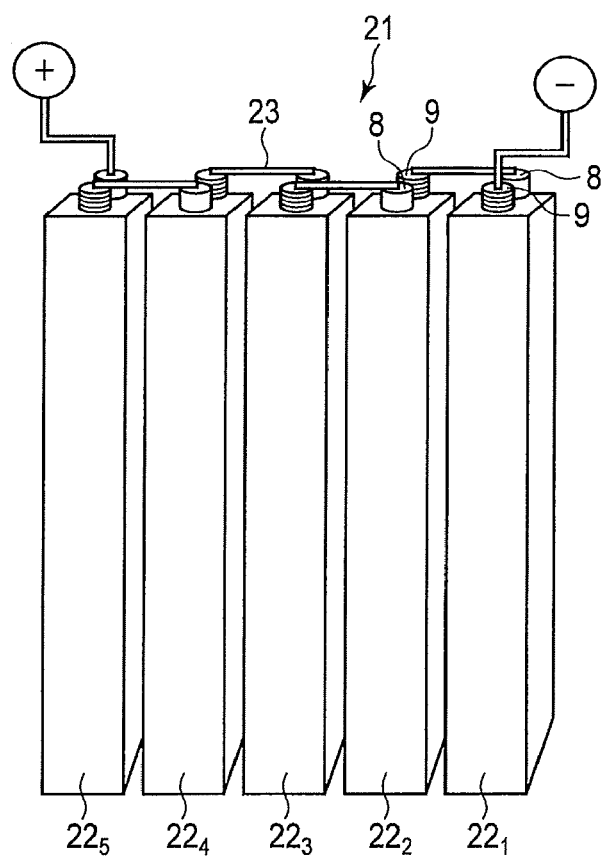
F I G. 7

ELECTRODE GROUP, SECONDARY BATTERY, BATTERY PACK, AND VEHICLE

CROSS-REFERENCE TO RELATED APPLICATIONS

This application is based upon and claims the benefit of priority from the Japanese Patent Application No. 2017-178798, filed Sep. 19, 2017, the entire contents of which are incorporated herein by reference.

FIELD

Embodiments described herein relate generally to an electrode group, a secondary battery, a battery pack and a vehicle.

BACKGROUND

A nonaqueous electrolyte battery containing metal lithium, a lithium alloy, a lithium compound, or a carbonaceous material in a negative electrode is expected as a high-energy density battery. Thus, this battery has been extensively researched and developed. Lithium ion batteries each including a positive electrode containing $LiCoO_2$, $LiNi_{1/3}Co_{1/3}Mn_{1/3}O_2$, or $LiMn_2O_4$ as an active material and a negative electrode containing a carbonaceous material that allows lithium ions to be inserted/extracted have widely been put into practice. A metal oxide or alloy has been studied as an alternative to the carbonaceous material in the negative electrode.

Especially, when installing the battery in a vehicle such as an automobile, a material with excellent chemical and electrochemical stability, strength, and corrosion resistance is needed as the material of the negative electrode from the viewpoint of cycle performance under a high-temperature environment, high-output performance, long-term reliability, and safety. If high performance is required even in a cold district, high-output performance and long-life performance under a low-temperature environment are needed. On the other hand, from the viewpoint of improving safety performance, solid electrolytes, nonvolatile electrolytic solutions, and incombustible electrolytic solutions have been developed as electrolytes. However, the solid electrolytes, nonvolatile electrolytic solutions, and incombustible electrolytic solutions have not yet been put into practical use because they lower discharge rate performance, low-temperature performance, and long-life performance.

In development of an all-solid-state secondary battery, research and development have been conducted to improve the ionic conductivity of an oxide solid electrolyte or sulfide solid electrolyte. However, the ion conduction resistance or reaction resistance in each electrode and the interface resistance of the electrode/solid electrolyte are high, thereby imposing a problem concerning discharge performance and low-temperature performance. In a charge-and-discharge cycle, disconnection of ion conduction paths in the electrodes caused by expansion/contraction of the electrodes increases the resistance and degrades the joining of the electrode/solid electrolyte. As a result, the interface resistance of the electrode/solid electrolyte increases, and the cycle life performance and discharge rate performance significantly lower. These problems make it difficult for the all-solid-state secondary battery using the solid electrolyte to be put into practice.

BRIEF DESCRIPTION OF THE DRAWINGS

FIG. 7 is a perspective view showing an example of a battery module including secondary batteries according to another embodiment;

DETAILED DESCRIPTION

Figure 1:
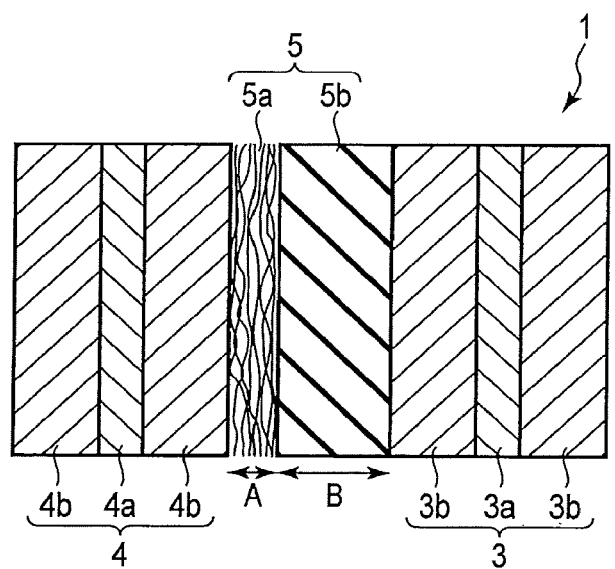
FIG. 1 is a sectional view showing an electrode group according to an embodiment.

According to one embodiment, there is provided an electrode group including a positive electrode active material-containing layer, a negative electrode active material-containing layer, a lithium ion conductive layer, and a porous layer. The lithium ion conductive layer includes lithium-containing inorganic particles. The lithium ion conductive layer covers at least part of the positive electrode active material-containing layer. The porous layer covers at least part of the negative electrode active material-containing layer. The positive electrode active material-containing layer and the negative electrode active material-containing layer face each other via the lithium ion conductive layer and the porous layer.

Another embodiment provides a secondary battery including the electrode group of the embodiment.

Another embodiment provides a battery pack including the secondary battery of the embodiment.

Another embodiment provides a vehicle including the battery pack of the embodiment.

First Embodiment

According to the first embodiment, there is provided an electrode group including a positive electrode active material-containing layer, a negative electrode active material-containing layer, a lithium ion conductive layer, and a porous layer. The lithium ion conductive layer covers at least part of the positive electrode active material-containing layer, and contains lithium-containing inorganic particles. The porous layer covers at least part of the negative electrode active material-containing layer. The positive electrode active material-containing layer and the negative electrode active material-containing layer face each other via the lithium ion conductive layer and porous layer. The lithium ion conductive layer and the porous layer are preferably in contact with each other, and more preferably integrated.

The lithium ion conductive layer can densely cover the surface of the positive electrode active material-containing layer without increasing the ion conduction resistance of a positive electrode. Furthermore, the porous layer can achieve a mechanical strength higher than that of the lithium ion conductive layer. Therefore, it is possible to provide an electrode group capable of implementing a secondary battery having excellent charge-and-discharge cycle life, low-temperature performance, and storage performance (self-discharge performance) by making the positive electrode active material-containing layer and the negative electrode active material-containing layer face each other via the lithium ion conductive layer and porous layer. In addition, since a composite layer formed from the lithium ion conductive layer and the porous layer has an excellent mechanical strength, it is possible to eliminate the need for a separator such as a so-called self-supporting film. Therefore, it is possible to reduce the resistance by the separator, thereby improving the discharge performance.

The electrode group desirably satisfies:

$$0.5 \leq B/A \leq 10 \tag{1}$$

where A represents the thickness (μm) of the porous layer, and B represents the thickness (μm) of the lithium ion conductive layer.

When the electrode group satisfies inequality (1), it is possible to decrease the thickness of the composite layer, and improve the low-temperature performance, storage performance, and cycle life performance. Setting of the value of B/A to 10 or less contributes to improvements in storage performance and cycle life performance. By setting the value of B/A to 0.5 or more, the low-temperature performance can be improved. A more preferable range is $1 \leq B/A \leq 5$.

The sum of A and B preferably ranges from 5 μm to 30 μm. If the sum is smaller than the range, the storage performance may degrade. If the sum exceeds the range, the low-temperature performance may degrade. A more preferable range is from 10 μm to 15 μm.

The lithium ion conductive layer desirably contains 0.1 wt % to 10 wt % of polymer fibers having an average fiber diameter of 1 nm to 100 nm. Thus, even if the thickness of the lithium ion conductive layer is 10 μm or less, the strength is high, and it is possible to largely reduce an internal short circuit and self-discharge while decreasing the internal resistance of the battery. Furthermore, the joining strength between the surface of the positive electrode active material-containing layer and the lithium ion conductive layer becomes large, and does not degrade in a charge-and-discharge cycle, and a rise in interface resistance is suppressed, thereby largely improving the cycle life performance.

The lithium ion conductive layer desirably further contains a polymer and a lithium ion-containing organic electrolytic solution. This can further decrease the lithium ion conduction resistance of the lithium ion conductive layer.

The porous layer desirably further contains polymer fibers having an average fiber diameter of 0.05 μm to 10 μm, and a lithium ion-containing organic electrolytic solution. This porous layer can decrease the ion conduction resistance in the porous layer, thereby improving the low-temperature performance, cycle life, and storage performance.

The specific surface area of the lithium-containing inorganic particles in the BET adsorption method by $N_2$ desirably ranges from 5 $m^2/g$ to 500 $m^2/g$. Since the lithium-containing inorganic particles satisfying this range have a large specific surface area, movement of lithium ions at the interface among the lithium ion-containing organic electrolytic solution, the polymer, and the lithium-containing inorganic particles is accelerated, thereby making it possible to improve the ionic conductivity of the lithium ion conductive layer. A preferable range is from 50 $m^2/g$ to 500 $m^2/g$.

The negative electrode active material-containing layer desirably contains a titanium-containing oxide. This can obtain a secondary battery having excellent charge-and-discharge cycle life, low-temperature performance, and storage performance (self-discharge performance).

The titanium-containing oxide desirably includes at least one material selected from the group consisting of a lithium titanium oxide having a spinel structure, a monoclinic titanium oxide, and a niobium titanium oxide. The secondary battery including the electrode group can improve the discharge cycle life, low-temperature performance, and storage performance (self-discharge performance).

The lithium ion conductive layer, porous layer, positive electrode active material-containing layer, and negative electrode active material-containing layer will be described below.

1) Lithium Ion Conductive Layer

The lithium ion conductive layer contains lithium-containing inorganic particles. The lithium ion conductive layer covers at least part of the positive electrode active material-containing layer. If the positive electrode active material-containing layer has a sheet shape (including a rectangular shape and square shape), the lithium ion conductive layer desirably covers at least one principal surface of the positive electrode active material-containing layer. In addition, the lithium ion conductive layer may cover at least one of end faces forming the periphery of the positive electrode active material-containing layer.

The lithium-containing inorganic particles may be inorganic particles having no lithium ion conductivity or low lithium ion conductivity, or an inorganic solid electrolyte having high lithium ion conductivity. One type or two or more types of lithium-containing inorganic particles can be used.

As the inorganic particles having no lithium ion conductivity or low lithium ion conductivity, lithium aluminum oxide (for example, $LiAlO_2$ or $Li_xAl_2O_3$ for $0<x \leq 1$), lithium silicon oxide, or lithium zirconium oxide can be used.

An example of the inorganic solid electrolyte having lithium ion conductivity includes an oxide solid electrolyte having a garnet structure. The oxide solid electrolyte having the garnet structure has high lithium ion conductivity and reduction resistance, thereby providing the advantage of a wide electrochemical window. Examples of the oxide solid electrolyte having the garnet structure include $Li_{5+x}A_xLa_{3-x}M_2O_{12}$ (A represents at least one element selected from the group consisting of Ca, Sr, and Ba, M represents Nb and/or Ta, and x is preferably equal to 0.5 or less (including 0)), $Li_3M_{2-x}L_2O_{12}$ (M represents Nb and/or Ta, L includes Zr, and x is preferably equal to 0.5 or less (including 0)), $Li_{7-3x}Al_xLa_3Zr_3O_{12}$ (x is preferably equal to 0.5 or less (including 0)), and $Li_7La_3Zr_2O_{12}$. Among them, $Li_{6.25}Al_{0.25}La_3Zr_3O_{12}$, $Li_{6.4}La_3Zr_{1.4}Ta_{0.6}O_{12}$, $Li_{6.4}La_3Zr_{1.6}Ta_{0.6}O_{12}$, and $Li_7La_3Zr_2O_{12}$ have high ionic conductivity, and are electrochemically stable, and thus have excellent discharge performance and cycle life performance. Furthermore, fine particles having a specific surface area of 5 $m^2/g$ to 500 $m^2/g$ (preferably, 50 $m^2/g$ to 500 $m^2/g$) have the advantage of being chemically stable with respect to an organic electrolytic solution containing an organic solvent.

An example of the inorganic solid electrolyte having lithium ion conductivity includes a lithium phosphate solid electrolyte having a NASICON structure. The lithium phosphate solid electrolyte having the NASICON structure has high stability to water, and is thus difficult to be eluted. The lithium phosphate solid electrolyte is also stable in the atmosphere. An example of the lithium phosphate solid electrolyte having the NASICON structure includes $LiM1_2(PO_4)_3$ where M1 includes one or more elements selected from the group consisting of Ti, Ge, Sr, Zr, Sn, and Al. Another example is a lithium phosphate solid electrolyte having the NASICON structure and expressed as $Li_{1+y}Al_xM_{2-x}(PO_4)_3$ (M represents at least one element selected from the group consisting of Ti, Ge, Sr, Sn, Zr, and Ca for $0 \le x \le 1$ and $0 \le y \le 1$). Preferable examples are $Li_{1+x}Al_xGe_{2-x}(PO_4)_3$, $Li_{1+x}Al_xZr_{2-x}(PO_4)_3$, and $Li_{1+x}Al_xTi_{2-x}(PO_4)_3$ where x preferably ranges from 0 to 0.5. Each of the exemplified solid electrolytes has high ionic conductivity, excellent stability in the atmosphere, and high electrochemical stability. Both the lithium phosphate solid electrolyte having the NASICON structure and the oxide solid electrolyte having the garnet structure may be used as inorganic solid electrolytes having lithium ion conductivity.

The content of the lithium-containing inorganic particles in the lithium ion conductive layer can be set within the range of 80 wt % to 98 wt %. By setting the content to 80 wt % or more, it is possible to avoid self-discharge along with an internal short circuit caused by a decrease in strength of the lithium ion conductive layer. By setting the content to 98 wt % or less, it is possible to prevent the ionic conductivity of the lithium ion conductive layer from abruptly decreasing, and improve the discharge performance and low-temperature performance. More preferably, the content ranges from 90 wt % to 95 wt %.

The lithium-containing inorganic particles can include single primary particles, secondary particles as the aggregates of primary particles, or a mixture of single primary particles and secondary particles.

The average size (diameter) of the primary particles of the lithium-containing inorganic particles desirably ranges from 0.01 μm to 1 μm. In this range, the ionic conductivity in the lithium ion conductive layer is improved, thereby improving the discharge performance and low-temperature performance. A more preferable range is from 0.05 μm to 0.5 μm.

The lithium-containing inorganic particles having a specific surface area of 5 $m^2/g$ to 500 $m^2/g$ in the BET adsorption method by $N_2$ are obtained by, for example, decreasing the average particle size (diameter) of the primary particles to 5 μm or less.

The lithium ion conductive layer desirably contains 0.1 wt % to 10 wt % of polymer fibers having an average fiber diameter of 1 nm to 100 nm. The polymer fibers having an average fiber diameter of 1 nm to 100 nm have a nano-size fiber diameter, and are thus readily dispersed in the lithium ion conductive layer to form fine through holes randomly arranged in the lithium ion conductive layer. As a result, an electrolyte such as a liquid electrolyte or gel electrolyte, the lithium-containing inorganic particles, and the like can be carried or held by the polymer fibers. As a result, even if the thickness of the lithium ion conductive layer is 10 μm or less, the strength is high, and it is possible to largely reduce an internal short circuit and self-discharge while decreasing the internal resistance of the battery. Furthermore, the joining strength between the surface of the positive electrode active material-containing layer and the lithium ion conductive layer is large. Since the joining does not degrade in a charge-and-discharge cycle, a rise in interface resistance is suppressed, thereby largely improving the cycle life performance. The average diameter of the polymer fibers more preferably ranges from 5 nm to 50 nm.

Even if the average diameter of the polymer fibers ranges from 1 nm to 100 nm, if the content of the polymer fibers in the lithium ion conductive layer exceeds 10 wt %, an organic electrolytic solution holding amount relatively decreases. Consequently, the ionic conductivity of the lithium ion conductive layer may decrease, and the low-temperature performance and charge-and-discharge cycle performance of the battery may lower. If the content of the polymer fibers is set to be smaller than 0.1 wt %, the effect of the polymer fibers having an average diameter of 1 nm to 100 nm cannot be obtained, thereby degrading the storage performance, low-temperature performance, and charge-and-discharge cycle performance. The content more preferably ranges from 0.5 wt % to 5 wt %.

If the polymer fibers include cellulose fibers, the aspect ratio of the polymer fibers can be set to, for example, a large value ranging from 100 to 10,000, thereby encouraging formation of fine through holes arranged like a mesh shape in the lithium ion conductive layer by the polymer fibers. As a result, extraction of the electrolyte and lithium-containing inorganic particles from the lithium ion conductive layer is further suppressed, and it is thus possible to further decrease the ion conduction resistance in the lithium ion conductive layer. Therefore, the secondary battery including the lithium ion conductive layer can further improve the charge-and-discharge cycle life, storage performance, and low-temperature performance.

The lithium ion conductive layer may further contain a lithium ion-containing organic electrolytic solution. The lithium ion-containing organic electrolytic solution is prepared by dissolving, for example, a lithium salt in a solvent including an organic solvent.

Examples of the lithium salt are $LiPF_6$, $LiClO_4$, $LiBF_4$, $LiCF_3SO_3$, $LiN(FSO_2)_2$, and $LiN(CF_3SO_2)_2$. At least one type of lithium salt selected from the group consisting of $LiPF_6$, $LiBF_4$, and $LiN(FSO_2)_2$ is improved in discharge performance by increasing the ionic conductivity.

The organic solvent desirably has a boiling point of 150° C. or higher. This can improve the endurance and life performance of the lithium ion conductive layer under a high-temperature environment.

The organic solvent desirably includes carbonates. Examples of the carbonates are a cyclic carbonate such as ethylene carbonate (EC), propylene carbonate (PC) and butylene carbonate (BC), a chain carbonate such as diethyl carbonate (DEC), methyl ethyl carbonate (MEC) and dimethyl carbonate (DMC). The use of propylene carbonate (PC), diethyl carbonate (DEC), or methyl ethyl carbonate (MEC) improves the low-temperature performance.

The organic solvent can include solvents other than carbonates. Examples are γ-butyrolactone (GBL), α-methyl-γ-butyrolactone (MBL), phosphoric acid esters (for example, trimethyl phosphate ($PO(OCH_3)_3$), triethyl phosphate ($PO(OC_2H_5)_3$), tripropyl phosphate ($PO(OC_3H_7)_3$), and tributyl phosphate ($PO(OC_4H_9)_3$)). Especially, the use of γ-butyrolactone or trimethyl phosphate suppresses a rise in ion conduction resistance under a low-temperature environment, thereby making it possible to improve the discharge performance under the low-temperature environment (−30° C. or lower).

The lithium ion conductive layer can contain a polymer (first polymer). The first polymer is not particularly limited as long as it can make a gel of the lithium ion-containing organic electrolytic solution, and either a chemical gel agent or a physical gel agent is usable. For example, a polymer that can make a gel containing a carbonate such as polyacrylonitrile (PAN), polyethylene oxide (PEO), polyvinylidene fluoride (PVdF), or polymethyl metacrylate can be used. When a gel of a polymer electrolyte is generated by compositing the carbonate and the first polymer, the ionic conductivity of the lithium ion conductive layer is improved.

The gel polymer electrolyte containing polyacrylonitrile has high ion conductivity, and is preferable to improve the discharge performance and low-temperature performance. The ratio of the first polymer to the lithium ion conductive layer preferably ranges from 1 wt % to 10 wt %. If the ratio falls outside the range, the low-temperature performance and discharge performance may lower. One type or two or more types of first polymers can be used. Note that if the above type of polymer is combined with sulfide solid electrolyte particles having high lithium ion conductivity, a sulfur component may be dissolved.

At least part of the surface of lithium-containing inorganic particles is desirably covered with a layered material containing a lithium ion-containing organic electrolytic solution and a polymer. The layered material may be a gel. This can further improve the ionic conductivity of the lithium ion conductive layer. As a result, it is possible to further improve the low-temperature performance and discharge performance of the secondary battery.

The lithium ion conductive layer may contain a binder to improve the mechanical strength. Examples of the binder are polyvinylidene fluoride (PVdF) and an acrylic binder. The binder may be added within the range of 0 to 5 wt %. If this range is exceeded, the ionic conductivity of the electrolyte may lower, thereby degrading the discharge performance.

The lithium ion conductive layer may be a gel electrolyte. By compositing the lithium ion-containing organic electrolytic solution with the first polymer, a gel electrolyte can be obtained. The gel electrolyte can cover at least part of the surface of lithium-containing inorganic particles. The gel electrolyte preferably, uniformly covers the surfaces of the lithium-containing inorganic particles.

The gel lithium ion conductive layer is obtained by, for example, mixing, with the lithium-containing inorganic particles, an electrolyte composition containing the lithium ion-containing organic electrolytic solution and the first polymer, and performing a heat treatment, as needed.

One type or two or more types of components such as the lithium-containing inorganic particles, polymer fibers, organic electrolytic solution, and first polymer can be contained in the above-described lithium ion conductive layer.

A method of measuring the content of the polymer fibers in the lithium ion conductive layer will be described below. The lithium ion conductive layer is ground using a mortar or the like, and the thus obtained ground product is dispersed in water to separate the polymer fibers and the lithium-containing inorganic particles using a specific gravity difference. The polymer fibers in a supernatant are dried at 100° C. for 12 hours, and the weight of the polymer fibers is measured, thereby obtaining the content of the polymer fibers in the lithium ion conductive layer.

The polymer fibers whose weight has been measured by the above-described method are observed by an SEM (Scanning Electron Microscope) at a magnification of 10,000, and widths are measured at positions of 25%, 50%, and 75% of the full length of the polymer fibers within the field of view. The average of the values of the measured widths is obtained as an average fiber diameter. Measurement is performed for all the polymer fibers existing within the field of view.

A method of measuring the content of the lithium-containing inorganic particles in the lithium ion conductive layer will be described below. TG (Thermogravimetry) measurement of the lithium ion conductive layer is performed up to 800° C., and then it is possible to measure the content of the lithium-containing inorganic particles based on decreases in weights of the organic solvent, polymer fibers, and binder.

The average primary particle size of the lithium-containing inorganic particles is measured by the following method. That is, a laser diffraction particle-size analyzer (SALD-300 of Shimadzu corporation or an apparatus having the equivalent function) is used to perform measurement by a method of adding about 0.1 g of a sample, a surfactant, and 1 to 2 mL of distilled water to a beaker, sufficiently stirring them, injecting the mixture into a water stirring tank, measuring a luminous intensity distribution 64 times at an interval of 2 sec, and analyzing particle size distribution data.

The BET specific surface area of the lithium-containing inorganic particles by $N_2$ adsorption is measured under the following conditions. As a sample, 1 g of lithium-containing inorganic particles are used. A BET specific surface area measurement apparatus available from Yuasa Ionics is used and nitrogen gas is used as adsorption gas.

It is confirmed by the following method that the lithium ion conductive layer is a gel. A gel can be confirmed by applying a pressure of 10 $g/cm^2$ to the lithium ion conductive layer, and checking whether the electrolytic solution oozes or not.

With respect to the lithium ion conductive layer included in the secondary battery, if the average fiber diameter of the polymer fibers and the like are confirmed, the lithium ion conductive layer is extracted from the secondary battery by the following method. That is, the secondary battery is disassembled in a glove box filled with argon to extract the electrode group. The lithium ion conductive layer is separated from the electrodes of the extracted electrode group. The lithium ion conductive layer is washed by dimethyl carbonate to remove the electrolyte, and dried. After that, the average fiber diameter of the polymer fibers and the like are confirmed.

2) Porous Layer

The porous layer covers at least part of the negative electrode active material-containing layer. If the negative electrode active material-containing layer has, for example, a sheet shape (including a rectangular shape and square shape), the porous layer desirably covers at least one principal surface of the negative electrode active material-containing layer. In addition, the porous layer may cover at least one of end faces forming the periphery of the negative electrode active material-containing layer.

Examples of the porous layer include a porous film, a nonwoven fabric, and a layer containing polymer fibers.

An example of the porous film is a polyolefin porous film. For example, at least one of polyethylene and polypropylene can be used as polyolefin.

An example of the nonwoven fabric is a nonwoven fabric made of cellulose fibers.

An example of the layer containing the polymer fibers is a layer having a porous structure in which polymer fibers are two- or three-dimensionally arranged. Examples of a polymeric material forming the polymer fibers include one type or two or more types selected from the group consisting of aramid, polyamide-imide, polyamide, polyolefin, polyether, polyimide, polyketone, polysulfone, cellulose, polyvinyl alcohol (PVA), and polyvinylidene fluoride (PVdF). Examples of polyolefin are polypropylene (PP) and polyethylene (PE). Preferable examples of the polymer fibers include aramid fibers and cellulose fibers.

This can decrease the ion conduction resistance in the porous layer, thereby improving the low-temperature performance, cycle life, and storage performance.

The average fiber diameter of the polymer fibers can range from 0.05 μm to 10 μm. By setting the average fiber diameter to 0.05 μm or more, it is possible to apply a sufficient strength to the porous layer. By setting the average fiber diameter to 10 µm or less, the organic electrolytic solution holding amount of the porous layer can be sufficient. By setting the average fiber diameter within the range of 0.05 µm to 10 µm, it is possible to obtain excellent strength and organic electrolytic solution holding property of the porous layer. The average fiber diameter more preferably ranges from 0.2 µm to 1 µm.

The layer containing the polymer fibers is produced by, for example, an electrospinning method. In the electrospinning method, a layer of polymer fibers is directly formed on a substrate by discharging a raw material solution from a spinning nozzle over the surface of the substrate while applying a voltage to the spinning nozzle using a high-voltage generator. The applied voltage is appropriately determined in accordance with solvent/solute species, the boiling point/vapor pressure curve of the solvent, the solution concentration, the temperature, the nozzle shape, the sample-nozzle distance, and the like, and the potential difference between the nozzle and the work can be set within the range of 0.1 kV to 100 kV. In addition, the supply speed of the raw material solution is appropriately determined in accordance with the solution concentration, the solution viscosity, the temperature, the pressure, the applied voltage, the nozzle shape, and the like. If the nozzle shape is a syringe type, for example, the supply speed can be set within the range of 0.1 to 500 µl/min per nozzle. If the nozzle shape is a multiple nozzle or a slit, the supply speed is determined in accordance with the opening area.

As the raw material solution, a solution prepared by dissolving a polymeric material in a solvent is used. The concentration of the polymeric material in the solvent can be set within, for example, the range of 5 mass % to 60 mass %. The solvent in which the polymeric material is dissolved is not particularly limited, and an arbitrary solvent such as dimethylacetamide (DMAc), dimethyl sulfoxide (DMSO), N,N-dimethylformamide (DMF), N-methyl pyrrolidone (NMP), water, or any alcohol. Electrospinning is performed for the polymeric material having low solubility while melting the polymeric material sheet by a laser or the like. In addition, a mixed solvent containing a high-boiling point organic solvent and a low-boiling point solvent may be used.

The thickness of the porous layer may range from 1 µm to 10 µm.

The porous layer may contain a lithium ion-containing organic electrolytic solution. A lithium ion-containing organic electrolytic solution similar to that described for the lithium ion conductive layer can be used.

The porous layer may contain a polymer. A polymer similar to that described for the lithium ion conductive layer can be used.

The porosity of the porous layer preferably ranges from 30% to 80%. The pores hold a liquid or gel nonaqueous electrolyte.

One type or two or more types of components such as the polymeric material, polymer fibers, organic electrolytic solution, and polymer can be contained in the above-described porous layer.

The average fiber diameter of the polymer fibers is measured, as follows. The porous layer is ground using a mortar or the like, and the thus obtained ground product is dispersed in water to separate the polymer fibers and the remaining material components using a specific gravity difference. The polymer fibers in a supernatant are dried at 100° C. for 12 hours. Then, the polymer fibers are observed by an SEM (Scanning Electron Microscope) at a magnification of 10,000, and widths are measured at positions of 25%, 50%, and 75% of the full length of the polymer fibers within the field of view. The average of the values of the measured widths is obtained as an average fiber diameter. Measurement is performed for all the polymer fibers existing within the field of view.

It is confirmed by the following method that the porous layer is a gel. A gel can be confirmed by applying a pressure of 10 g/cm² to the porous layer, and checking whether the electrolytic solution oozes or not.

With respect to the porous layer included in the secondary battery, if the average fiber diameter of the polymer fibers and the like are confirmed, the porous layer is extracted from the secondary battery by the following method. That is, the secondary battery is disassembled in a glove box filled with argon to extract the electrode group. The porous layer is separated from the electrodes of the extracted electrode group. The porous layer is washed by dimethyl carbonate to remove the electrolyte, and dried. After that, the average fiber diameter of the polymer fibers and the like are confirmed.

3) Positive Electrode Active Material-Containing Layer

The positive electrode active material-containing layer contains positive electrode active material particles that allows lithium ions to be inserted/extracted. Furthermore, the positive electrode active material-containing layer may further contain a conductive agent and a binder.

Examples of the positive electrode active material include a lithium manganese composite oxide, a lithium cobalt composite oxide, a lithium nickel composite oxide, a lithium nickel cobalt composite oxide, a lithium cobalt aluminum composite oxide, a lithium nickel aluminum composite oxide, a lithium manganese nickel composite oxide having a spinel structure, a lithium manganese cobalt composite oxide, a lithium-containing phosphate compound having an olivine structure, a fluorinated iron sulfate, and a lithium nickel cobalt manganese composite oxide. One type or two or more types of positive electrode active materials can be used.

As the lithium manganese composite oxide, for example, $Li_xMn_2O_4$ (0<x≤1), $Li_xMnO_2$ (0<x≤1), or the like can be used.

As the lithium cobalt composite oxide, for example, $Li_xCoO_2$ (0<x≤1) or the like can be used.

As the lithium nickel aluminum composite oxide, for example, $Li_xNi_{1-y}Al_yO_2$ (0<x≤1, 0<y≤1) or the like can be used.

As the lithium nickel cobalt composite oxide, for example, $Li_xNi_{1-y-z}Co_yMn_zO_2$ (0<x≤1, 0<y≤1, 0≤z≤1, 0<1-y-z<1) or the like can be used.

As the lithium manganese cobalt composite oxide, for example, $Li_xMn_yCo_{1-y}O_2$ (0<x≤1, 0<y<1) or the like can be used.

As the lithium manganese nickel composite oxide having the spinel structure, for example, $Li_xMn_{2-y}Ni_yO_4$ (0<x≤1, 0<y<2) or the like can be used.

As the lithium-containing phosphate compound having the olivine structure, for example, $Li_xFePO_4$ (0<x≤1), $Li_xFe_{1-y}Mn_yPO_4$ (0<x≤1, 0≤y≤1), $Li_xCoPO_4$ (0<x≤1), $Li_xMnPO_4$ (0<x≤1), or the like can be used.

As the fluorinated iron sulfate, for example, $Li_xFeSO_4F$ (0<x≤1) or the like can be used.

As the lithium nickel cobalt manganese composite oxide, for example, $Li_xNi_{1-y-z}Co_yMnO_2$ (0<x≤1.1, 0<y≤0.5, 0<z≤0.5, 0<1-y-z<1) or the like can be used.

With the above positive electrode active materials, it is possible to obtain a high positive electrode voltage. Among them, the lithium nickel aluminum composite oxide, lithium nickel cobalt manganese composite oxide, and lithium manganese cobalt composite oxide can suppress a reaction with an electrolyte under a high-temperature environment and greatly improve the battery life. The lithium nickel cobalt manganese composite oxide expressed as $Li_xNi_{1-y-z}Co_yMn_zO_2$ can obtain a long heat endurance life.

The positive electrode active material particles may be primary particles, secondary particles as the aggregates of primary particles, or a mixture of primary particles and secondary particles.

The average primary particle size of the positive electrode active material particles can range from 0.1 μm to 3 μm.

The average secondary particle size of the positive electrode active material particles can range from 3 μm to 20 μm.

The conductive agent can improve the electron conductivity and suppress the contact resistance to a current collector. As the conductive agent, for example, acetylene black, carbon black, or graphite can be used.

The binder can bind the active material and the conductive agent. As the binder, for example, a polymer such as polytetrafluoroethylene (PTFE), polyvinylidene fluoride (PVdF), or fluorine-based rubber can be used.

The positive electrode active material-containing layer may contain lithium-containing inorganic particles. As the lithium-containing inorganic particles, the above-described particles are used.

Furthermore, the positive electrode active material-containing layer may contain a polymer used to produce a gel of the electrolyte in the positive electrode. As the polymer, the above-described one is used.

One type or two or more types of components such as the positive electrode active material, conductive agent, binder, lithium-containing inorganic particles, and polymer can be contained in the above-described positive electrode.

As the mixing ratio of the positive electrode active material, the conductive agent, and the binder, the content of the positive electrode active material preferably ranges from 80 wt % to 95 wt %, the content of the conductive agent preferably ranges from 3 wt % to 18 wt %, and the content of the binder preferably ranges from 2 wt % to 7 wt %. The conductive agent can exhibit the above-described effect at 3 wt % or more, and can reduce decomposition of the electrolyte on the conductive agent surface stored under a high temperature at 18 wt % or less. The binder can obtain a sufficient electrode strength at 2 wt % or more, and can reduce the insulating portion of the electrode at 7 wt % or less.

The thickness of one positive electrode active material-containing layer can range from 10 μm to 120 μm. If positive electrode active material-containing layers are formed on both surfaces of the positive electrode current collector, the total thickness of the positive electrode active material-containing layers can range from 20 μm to 240 μm.

The average primary particle size and the average secondary particle size of the positive electrode active material particles are measured by the following method. That is, a laser diffraction particle-size analyzer (SALD-300 of Shimadzu corporation or an apparatus having the equivalent function) is used to perform measurement by a method of adding about 0.1 g of a sample, a surfactant, and 1 to 2 mL of distilled water to a beaker, sufficiently stirring them, injecting the mixture into a water stirring tank, measuring a luminous intensity distribution 64 times at an interval of 2 sec, and analyzing particle size distribution data.

4) Negative Electrode Active Material-Containing Layer

The negative electrode active material-containing layer contains an active material, and can further contain a conductive agent and a binder.

The negative electrode active material is not particularly limited as long as it is possible to allow lithium ions to be inserted/extracted, and includes a carbon material, graphite material, lithium alloy, metal oxide, and metal sulfide. One type or two or more types of negative electrode active materials can be used. A negative electrode active material containing a titanium-containing oxide is preferable. When a titanium-containing oxide is used, an aluminum foil or aluminum alloy foil can be used as a negative electrode current collector in place of a copper foil, thereby reducing the weight and the cost. Additionally, this is advantageous in a bipolar electrode structure. The insertion/extraction potential of the lithium ions of the titanium-containing oxide preferably ranges from 1 V to 3 V (vs. Li/Li$^+$) relative to the Li potential. Examples of the titanium-containing oxide satisfying the above condition include a lithium titanium oxide, a titanium oxide, a niobium titanium oxide, and a sodium niobium titanium oxide. The titanium-containing oxide desirably includes at least one material selected from the group consisting of a lithium titanium oxide having a spinel structure, a monoclinic titanium oxide, and a niobium titanium oxide.

Examples of the lithium titanium oxide include a lithium titanium oxide having a spinel structure (for example, the general formula is $Li_{4+x}Ti_5O_{12}$ ($-1 \le x \le 3$)), a lithium titanium oxide having a ramsdellite structure (for example, $Li_{2+x}Ti_3O_7$ ($-1 \le x \le 3$)), $Li_{1+x}Ti_2O_4$ ($0 \le x \le 1$), $Li_{1.1+x}Ti_{1.8}O_4$ ($0 \le x \le 1$), and $Li_{1.07+x}Ti_{1.86}O_4$ ($0 \le x \le 1$).

Examples of the titanium oxide include a titanium oxide having a monoclinic crystal structure (for example, the structure before charge is $TiO_2(B)$, $Li_xTiO_2$ ($0 \le x$)), a titanium oxide having a rutile structure (for example, the structure before charge is $TiO_2$, $Li_xTiO_2$ ($0 \le x$)), and a titanium oxide having an anatase structure (for example, the structure before charge is $TiO_2$, $Li_xTiO_2$ ($0 \le x$)).

Examples of the niobium titanium oxide include a material expressed as $Li_aTiM_bNb_{2\pm\beta}O_{7\pm\sigma}$ ($0 \le a \le 5$, $0 \le b \le 0.3$, $0 \le \beta \le 0.3$, $0 \le \sigma \le 0.3$, M is at least one element selected from the group consisting of Fe, V, Mo, and Ta).

Examples of the sodium niobium titanium oxide include an orthorhombic Na-containing niobium titanium composite oxide represented by the general formula $Li_{2+v}Na_{2-w}M1_xTi_{6-y-z}Nb_yM2_zO_{14+\delta}$ ($0 \le v \le 4$, $0 < w < 2$, $0 \le x < 2$, $0 < y \le 6$, $0 \le z < 3$, $-0.5 \le \delta \le 0.5$, $0 < 6-y-z < 6$, M1 includes at least one material selected from the group consisting of Cs, K, Sr, Ba, and Ca, and M2 includes at least one material selected from the group consisting of Zr, Sn, V, Ta, Mo, W, Fe, Co, Mn, and Al).

A preferable negative electrode active material is a lithium titanium oxide having a spinel structure. The lithium titanium oxide having the spinel structure has a small volume change at the time of charge/discharge. In addition, an aluminum foil or aluminum alloy foil can be used as a negative electrode current collector in place of a copper foil, thereby reducing the weight and the cost. This is advantageous in a bipolar electrode structure. The ratio of a negative electrode active material other than the titanium-containing oxide to the whole negative electrode active material is desirably 50 wt % or less.

The particles of the titanium-containing oxide can include single primary particles, secondary particles as the aggregates of primary particles, or a mixture of single primary particles and secondary particles.

The average particle size (diameter) of the secondary particles can be set to 2 µm or more, preferably, over 5 µm. The average particle size more preferably ranges from 7 µm to 20 µm. In this range, a negative electrode having a high density can be produced while keeping a negative electrode press pressure low, and it is possible to suppress elongation of the aluminum-containing current collector. The secondary particles of the titanium-containing oxide are obtained, as follows. That is, for example, the raw materials of the active material are reactively synthesized to produce an active material precursor having an average particle size of 1 µm or less. After that, a firing treatment is performed, and a grinding treatment is performed using a grinder such as a ball mill or a jet mill. Next, in a firing treatment, the active material precursor is aggregated to grow secondary particles with a larger particle size.

The average particle size (diameter) of the primary particles is desirably 1 µm or less. The effect is remarkable in high input performance and rapid charge performance. This is because, for example, the diffusion distance of lithium ions in the active material is shortened and the specific surface area is increased. A more preferable average particle size ranges from 0.1 µm to 0.8 µm. The negative electrode active material-containing layer may contain a mixture of the primary particles and secondary particles of the titanium-containing oxide. In terms of improving the density, the negative electrode active material-containing layer preferably contains 5 vol % to 50 vol % of primary particles.

At least part of the surface of the titanium-containing oxide particles is desirably covered with a carbon material layer. This can reduce the negative electrode resistance. By covering at least part of the surface of the niobium titanium oxide particles with a carbon material layer, it is possible to improve the electron conductivity in the negative electrode active material. Since the porous layer can cover the surface of the negative electrode active material-containing layer with a fine thin film, it is possible to avoid an internal short circuit caused by contact between the positive electrode active material-containing layer and the carbon material layer exposed to the negative electrode active material-containing layer. Note that the carbon material layer desirably covers at least the surfaces of the secondary particles of the niobium titanium oxide, the interiors of the secondary particles, or the surfaces of the primary particles of the niobium titanium oxide, or all of them.

A carbon material precursor is added in a secondary particle manufacturing process, and fired at 500° C. or higher in an inert atmosphere, thereby making it possible to cover at least part of the surface of the titanium-containing oxide particles with the carbon material layer.

The content of the carbon material layer in the negative electrode active material can range from 1 wt % to 10 wt %.

The titanium-containing oxide particles have an average primary particle size of 1 µm or less, and the specific surface area in the BET method by $N_2$ adsorption preferably ranges from 3 $m^2/g$ to 200 $m^2/g$. This can further improve the affinity of the negative electrode for an electrolyte.

The specific surface area of the negative electrode active material-containing layer preferably ranges from 3 $m^2/g$ to 50 $m^2/g$, more preferably, 5 $m^2/g$ to 50 $m^2/g$, and much more preferably, 1 $m^2/g$ to 20 $m^2/g$. In this range, reductive decomposition of an electrolyte under a high-temperature environment is suppressed, thereby improving the cycle life. The specific surface are of the negative electrode active material-containing layer indicates the surface area of the negative electrode active material-containing layer per g (except the weight of the current collector). Note that the negative electrode active material-containing layer can be a porous layer containing a negative electrode active material, a conductive agent, and a binder.

The porosity of the negative electrode active material-containing layer (except the current collector) desirably ranges from 20% to 50%. A negative electrode having a high affinity for an electrolyte and also having a high density can thus be obtained. The porosity more preferably ranges from 25% to 40%.

The thickness of one negative electrode active material-containing layer can range from 10 µm to 120 µm. If negative electrode active material-containing layers are formed on both surfaces of the negative electrode current collector, the total thickness of the negative electrode active material-containing layers can range from 20 µm to 240 µm.

As the conductive agent, for example, a carbon material, metal compound powder, or metal powder can be used. Examples of the carbon material are acetylene black, carbon black, coke, carbon fiber, and graphite. The BET specific surface area of the carbon material by $N_2$ adsorption is preferably 10 $m^2/g$ or more. Examples of the metal compound powder include TiO, TiC, and TiN powders. Examples of the metal powder include Al, Ni, Cu, and Fe powders. Preferable examples of the conductive agent include coke having an average particle size of 10 µm or less at a heat-treatment temperature of 800° C. to 2,000° C., graphite, acetylene black, carbon fiber having an average fiber diameter of 1 µm or less, and a TiO powder. One or more materials selected from them can reduce the electrode resistance and improve the cycle life performance. One type or two or more types of conductive agents can be used.

Examples of the binder are polytetrafluoroethylene (PTFE), polyvinylidene fluoride (PVdF), fluorine-based rubber, acrylic rubber, styrene butadiene rubber, a core shell binder, and polyimide. One type or two or more types of binders can be used.

One type or two or more types of components such as the negative electrode active material, conductive agent, and binder can be contained in the above-described negative electrode.

As the mixing ratio of the negative electrode active material, the conductive agent, and the binder, the content of the negative electrode active material preferably ranges from 80 wt % to 95 wt %, the content of the conductive agent preferably ranges from 3 wt % to 18 wt %, and the content of the binder preferably ranges from 2 wt % to 7 wt %.

The average primary particle size and the average secondary particle size of the negative electrode active material are measured by the following method. That is, a laser diffraction particle-size analyzer (SALD-300 of Shimadzu corporation or an apparatus having the equivalent function) is used to perform measurement by a method of adding about 0.1 g of a sample, a surfactant, and 1 to 2 mL of distilled water to a beaker, sufficiently stirring them, injecting the mixture into a water stirring tank, measuring a luminous intensity distribution 64 times at an interval of 2 sec, and analyzing particle size distribution data.

The electrode group may include a positive electrode current collector and/or a negative electrode current collector. Furthermore, the electrode group may hold an electrolyte.

5) Positive Electrode Current Collector

The positive electrode active material-containing layer is carried or held by at least one principal surface, that is, one or both surfaces of the positive electrode current collector.

An aluminum foil or aluminum alloy foil can be used as a positive electrode current collector. The purity of the aluminum foil or aluminum alloy foil can be set to 99% or higher. The upper limit of the purity is 100% (pure aluminum). A more preferable aluminum purity ranges from 99% to 99.99%. In this range, it is possible to reduce deterioration in high-temperature cycle life caused by dissolution of an impurity element.

An aluminum alloy is preferably an alloy containing, in addition to aluminum, one or more elements selected from the group consisting of iron, magnesium, zinc, manganese, and silicon. For example, an Al—Fe based alloy, Al—Mn based alloy, and Al—Mg based alloy can obtain a strength higher than that of aluminum. On the other hand, the contents of aluminum and a transition metal such as nickel or chromium in an aluminum alloy are preferably 100 wt ppm or less (including 0 wt ppm). For example, an Al—Cu based alloy improves the strength but degrades the corrosion resistance.

The positive electrode current collector carrying or holding the positive electrode active material-containing layer is produced by, for example, the following method. The positive electrode current collector is produced by suspending the positive electrode active material, the conductive agent, and the binder in an appropriate solvent, applying the suspended substance to the positive electrode current collector, drying the suspended substance, and performing press. The positive electrode press pressure preferably ranges from 0.15 ton/mm to 0.3 ton/mm. This range is preferable because the adhesion (peel strength) between the positive electrode active material-containing layer and the positive electrode current collector such as an aluminum foil increases, and the elongation percentage of a positive electrode current collector foil becomes 20% or less.

6) Negative Electrode Current Collector

The negative electrode active material-containing layer is carried or held by at least one principal surface, that is, one or both surfaces of the negative electrode current collector.

An aluminum foil or aluminum alloy foil can be used as a negative electrode current collector. The purity of the aluminum foil or aluminum alloy foil can be set to 98% or higher. The upper limit of the purity is 100% which is a pure aluminum. A more preferable aluminum purity ranges from 98% to 99.95%. When a negative electrode active material containing titanium-containing oxide particles is used to reduce the negative electrode press pressure, it is possible to suppress elongation of the negative electrode current collector having the above-described purity. As a result, it is possible to improve the electron conductivity in the negative electrode current collector, and produce a low-resistance negative electrode by suppressing dissolution of the secondary particles of the titanium-containing oxide.

An aluminum alloy is preferably an alloy containing, in addition to aluminum, one or more elements selected from the group consisting of iron, magnesium, zinc, manganese, and silicon. For example, an Al—Fe based alloy, Al—Mn based alloy, and Al—Mg based alloy can obtain a strength higher than that of aluminum. On the other hand, the contents of a transition metal such as nickel or chromium in aluminum and an aluminum alloy are preferably 100 wt ppm or less (including 0 wt ppm). For example, an Al—Cu based alloy improves the strength but degrades the corrosion resistance.

The negative electrode current collector carrying or holding the negative electrode active material-containing layer is produced by, for example, the following method. The negative electrode current collector is produced by suspending particles of the negative electrode active material, the conductive agent, and the binder in an appropriate solvent, applying the suspended substance to the current collector, drying the suspended substance, and performing press (for example, heating press).

7) Electrolyte

Examples of the electrolyte are a liquid electrolyte and a gel electrolyte.

The liquid electrolyte may be an organic electrolytic solution containing an electrolyte salt such as a lithium salt and an organic solvent in which the electrolyte salt is dissolved. The gel electrolyte may contain an electrolyte salt such as a lithium salt, an organic solvent in which the electrolyte salt is dissolved, and a polymer (second polymer) as a gel agent.

As the lithium salt and the organic solvent, the materials described for the lithium ion conductive layer can be used.

As the second polymer, the material described for the first polymer can be used. The ratio of the second polymer to the electrolyte preferably ranges from 1 wt % to 10 wt %. If the ratio falls outside the range, the low-temperature performance and discharge performance may lower. One type or two or more types of polymers can be used.

The electrolyte may contain a binder to improve the mechanical strength. Examples of the binder are polyvinylidene fluoride (PVdF) and an acrylic binder. The binder may be added within the range of 0 to 5 wt %. If this range is exceeded, the ionic conductivity of the electrolyte may lower, thereby degrading the discharge performance.

One type or two or more types of components such as the lithium salt, organic solvent, polymer, and binder can be contained in the above-described electrolyte.

It is confirmed by the following method that the electrolyte is a gel. A gel can be confirmed by applying a pressure of 10 $g/cm^2$ to the electrolyte, and checking whether the electrolytic solution oozes or not.

A method of measuring the thicknesses (A+B) of the composite layer, the thickness B of the lithium ion conductive layer, and the thickness A of the porous layer will be described below. That is, the battery is disassembled in a glove box filled with argon to extract the electrode group. The electrode group may be washed to remove the electrolyte in the electrode group by vacuum drying. Subsequently, in the glove box, the thickness of the electrode group is measured while applying a predetermined load (for example, 10 $g/cm^2$) to the electrode group using a flat plate. While the flat plate is arranged on the electrode group, the electrode group is cut in parallel with each of positions corresponding to 10%, 50%, and 90% of the thickness of the electrode group from the surface of the electrode group contacting the flat plate. As a result, four electrode group samples divided in the direction perpendicular to the thickness of the electrode group. Each of the four electrode group samples is cut in a cross shape to pass through the center in the in-plane direction of the electrode group sample. With respect to each electrode group sample, one portion on a cross section obtained by cutting along one direction of the cross shape and one portion on a cross section obtained by cutting along the other direction of the cross shape are observed by the SEM (Scanning Electron Microscope). Therefore, the eight portions in total are observed. Furthermore, the observation magnification by the SEM is 100 to 1,000. In the field of view of each of the eight portions, the thickness B of the lithium ion conductive layer, the thickness A of the porous layer, and the thickness (A+B) of the composite layer are measured. The averages of the obtained measured values are obtained as the thicknesses A and B, and the sum of A and B.

FIG. 1 shows an example of the electrode group according to the embodiment. An electrode group 1 includes a positive electrode 3, a negative electrode 4, and a composite layer 5. The positive electrode 3 includes a sheet-shaped positive electrode current collector 3a and sheet-shaped positive electrode active material-containing layers 3b carried or held by both principal surfaces of the positive electrode current collector 3a. On the other hand, the negative electrode 4 includes a sheet-shaped negative electrode current collector 4a and sheet-shaped negative electrode active material-containing layers 4b carried or held by both principal surfaces of the negative electrode current collector 4a. The positive electrode active material-containing layer 3b and the negative electrode active material-containing layer 4b face each other via the composite layer 5. The composite layer 5 includes a porous layer 5a and a lithium ion conductive layer 5b integrated with the porous layer 5a. The composite layer 5 may also include an electrolyte held by the electrode group 1. The porous layer 5a covers the principal surface of the negative electrode active material-containing layer 4b. The lithium ion conductive layer 5b covers the principal surface of the positive electrode active material-containing layer 3b. Reference symbol A denotes a thickness (μm) of the porous layer 5a; and B; a thickness (μm) of the lithium ion conductive layer 5b.

In the electrode group according to the above-described first embodiment, the positive electrode active material-containing layer and the negative electrode active material-containing layer face each other via the porous layer and the lithium ion conductive layer containing lithium-containing inorganic particles. This electrode group has small self-discharge and excellent lithium ion conductivity. Therefore, the secondary battery including the electrode group has excellent charge-and-discharge cycle life, low-temperature performance, and storage performance (self-discharge performance).

Second Embodiment

A secondary battery according to the second embodiment includes an electrode group according to the first embodiment and an electrolyte held by the electrode group. The secondary battery according to the second embodiment may include a container member that stores the electrode group and the electrolyte.

As the container member, a laminated film container or a metal container can be used. The container can have a shape conforming to the form of the secondary battery.

The thickness of the laminated film preferably falls within the range of 0.5 mm or less. A more preferable range is 0.2 mm or less. The lower limit value of the thickness of the laminated film is desirably set to 0.01 mm.

On the other hand, the plate thickness of the metal container preferably falls within the range of 0.5 mm or less. A more preferable range is 0.3 mm or less. The lower limit value of the plate thickness of the metal container is desirably set to 0.05 mm.

As the laminated film, for example, a multilayer film including a metal layer and a resin layer covering the metal layer can be used. To reduce the weight, the metal layer is preferably an aluminum foil or an aluminum alloy foil. The purity of the aluminum foil is preferably 99.5 wt % or more. The resin layer reinforces the metal layer, and can be formed from a polymer such as polypropylene (PP), polyethylene (PE), nylon, or polyethylene terephthalate (PET).

The laminated film container can be obtained by sealing laminated films using heat seal.

As the metal container, a metal can made of aluminum, an aluminum alloy, iron, or stainless steel and having a rectangular or cylindrical shape is usable. The metal container is desirably made of aluminum or an aluminum alloy. As the aluminum alloy, an alloy containing aluminum and at least one element selected from the group consisting of manganese, magnesium, zinc, and silicon. The aluminum purity of the alloy is preferably 99.8 wt % or more. When the strength of the metal can made of an aluminum alloy significantly increases, it is possible to thin the thickness of the can. As a result, it is possible to implement a thin and lightweight battery having a high output and excellent heat dissipation.

The metal container can be sealed by a laser. Therefore, it is possible to reduce the volume of a sealing portion, as compared to the laminated film container, thereby improving the energy density.

The secondary battery according to the embodiment can be applied to secondary batteries in various forms such as a rectangular type, a cylindrical type, a flat type, a thin type, and a coin type. The secondary battery preferably has a bipolar structure. This is advantageous in producing one secondary battery having a voltage equal to that of a plurality of serial batteries. A bipolar cell including a lithium ion conductive layer can prevent a short circuit caused by an electrolyte.

An example of the secondary battery according to the embodiment will be described with reference to FIGS. 2, 3, 4, 5, and 6.

Figure 2:
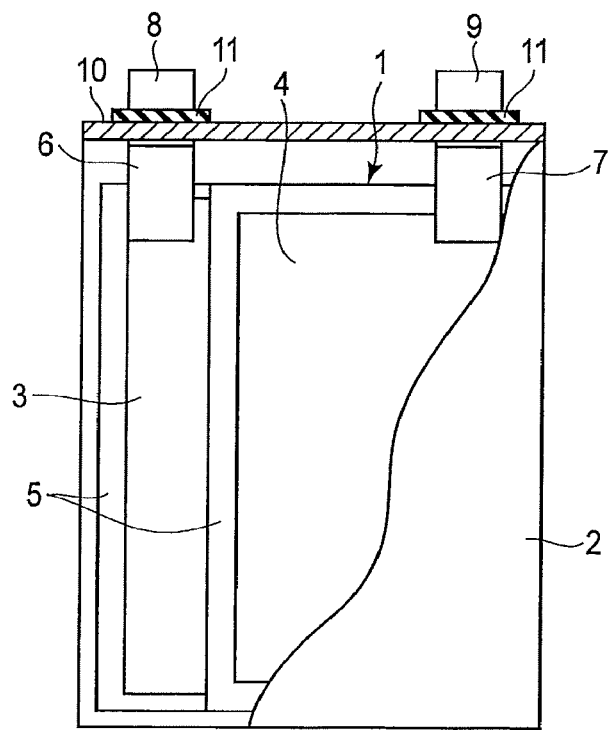
FIG. 2 is a partially cutaway sectional view showing a secondary battery according to another embodiment.
Figure 3:
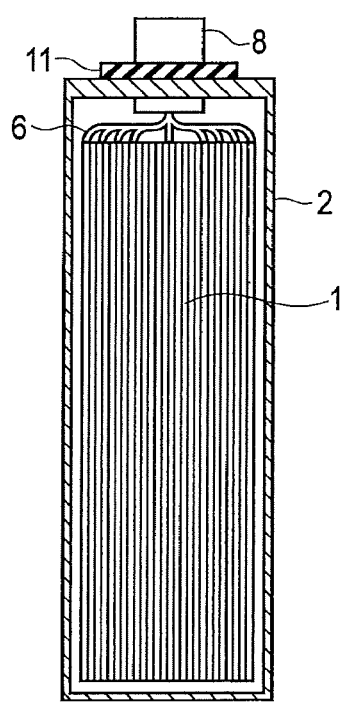
FIG. 3 is a side view of the battery shown in FIG. 2.

FIGS. 2 and 3 show an example of the secondary battery using a metal container.

An electrode group 1 is stored in a rectangular tubular metal container 2. The electrode group 1 has a structure formed by spirally winding the positive electrode active material-containing layer of a positive electrode 3 and the negative electrode active material-containing layer of a negative electrode 4 with a composite layer 5 interposing therebetween so as to form a flat shape. The lithium ion conductive layer of the composite layer 5 covers the surface (principal surface) of the positive electrode active material-containing layer, and the porous layer of the composite layer 5 covers the surface (principal surface) of the negative electrode active material-containing layer. As shown in FIG. 3, a strip-shaped positive electrode lead 6 is electrically connected to each of a plurality of portions at an end of the positive electrode 3 located on an end face of the electrode group 1. A strip-shaped negative electrode lead 7 is electrically connected to each of a plurality of portions at an end of the negative electrode 4 located on the end face. The plurality of positive electrode leads 6 are bundled, and in this state, electrically connected to a positive electrode tab 8. A positive electrode terminal is formed from the positive electrode leads 6 and the positive electrode tab 8. In addition, the negative electrode leads 7 are bundled, and in this state, connected to a negative electrode tab 9. A negative electrode terminal is formed from the negative electrode leads 7 and the negative electrode tab 9. A sealing plate 10 made of a metal is fixed to the opening portion of the metal container 2 by welding or the like. The positive electrode tab 8 and the negative electrode tab 9 are extracted to the outside from outlet holes formed in the sealing plate 10, respectively. The inner surface of each outlet hole of the sealing plate 10 is covered with an insulating member 11 to avoid a short circuit caused by contact between the positive electrode tab 8 and the negative electrode tab 9.

Figure 4:
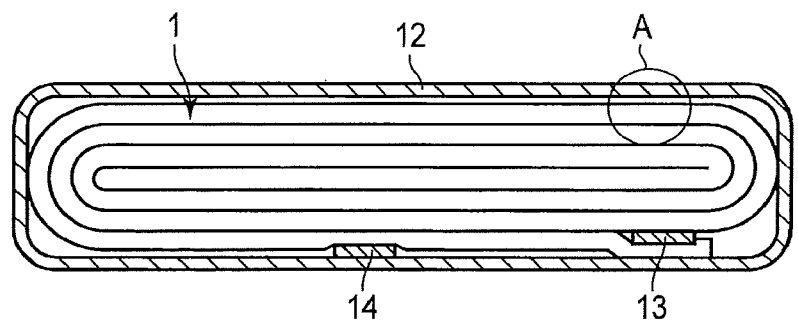
FIG. 4 is a sectional view showing the secondary battery taken along the direction perpendicular to a terminal extending direction according to an embodiment.
Figure 5:
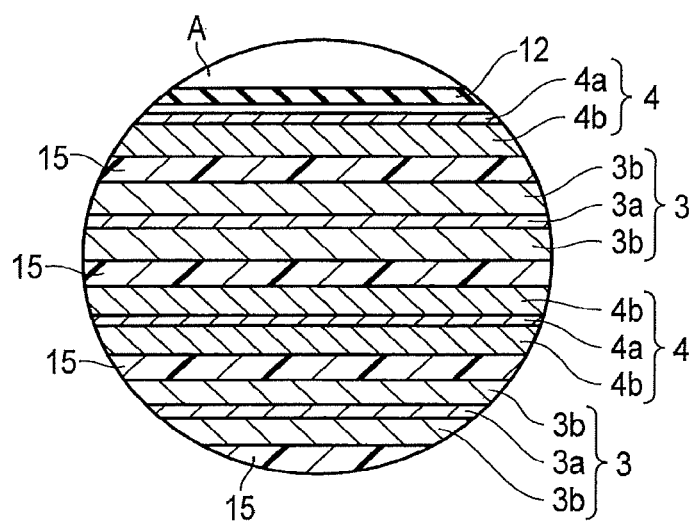
FIG. 5 is an enlarged sectional view showing a portion A in FIG. 4.

FIGS. 4 and 5 show an example of a secondary battery using a container member made of a laminated film.

As shown in FIGS. 4 and 5, the flat wound electrode group 1 is stored in a sack-shaped container member 12 made of a laminated film including a metal layer interposing between two resin films. The flat wound electrode group 1 is formed by spirally winding a stacked structure obtained by stacking the negative electrode 4, a composite layer 15, the positive electrode 3, and the composite layer 15 from the outside, and pressing the stacked structure. The lithium ion conductive layer of the composite layer 15 covers the surface (principal surface) of the positive electrode active material-containing layer, and the porous layer of the composite layer 15 covers the surface (principal surface) of the negative electrode active material-containing layer. The outermost negative electrode 4 has an arrangement in which a negative electrode layer (negative electrode active material-containing layer) 4b containing a negative electrode active material on one surface on the inner side of a negative electrode current collector 4a, as shown in FIG. 5, and the remaining negative electrodes 4 are arranged by forming the negative electrode layers 4b on both surfaces of the negative electrode current collector 4a. The positive electrode 3 is arranged by forming positive electrode layers (positive electrode active material-containing layers) 3b on both surfaces of a positive electrode current collector 3a.

Near the outer end of the wound electrode group 1, a negative electrode terminal 13 is connected to the negative electrode current collector 4a of the outermost negative electrode 4, and a positive electrode terminal 14 is connected to the positive electrode current collector 3a of the positive electrode 3 on the inner side. The negative electrode terminal 13 and the positive electrode terminal 14 extend outward from the opening portion of the sack-shaped container 12. The opening portion of the sack-shaped container 12 is heat-sealed, thereby sealing the wound electrode group 1. At the time of heat-sealing, the negative electrode terminal 13 and the positive electrode terminal 14 are sandwiched by the sack-shaped container member 12 in the opening portion.

A secondary battery having a bipolar structure will be described next. The secondary battery further includes a current collector with the first surface and the second surface located on the opposite side of the first surface. As the current collector, a current collector similar to the positive or negative electrode current collector of the secondary battery is usable. The secondary battery has a bipolar structure in which a positive electrode active material-containing layer is formed on the first surface of the current collector, and a negative electrode active material-containing layer is formed on the second surface. A lithium ion conductive layer and a porous layer interpose between the positive electrode active material-containing layer and the negative electrode active material-containing layer. As the positive and negative electrode active material-containing layers, positive and negative electrode active material-containing layers similar to those described for the electrode group are usable.

The lithium ion conductive layer and the porous layer improve the ionic conductivity in the secondary battery having the bipolar structure. This can implement one single battery of a high-voltage secondary battery without connecting a plurality of single batteries in series. Furthermore, the lithium ion conductive layer and the porous layer can take the form of a gel, and thus prevent a short circuit caused via an electrolytic solution in the bipolar cell.

Figure 6:
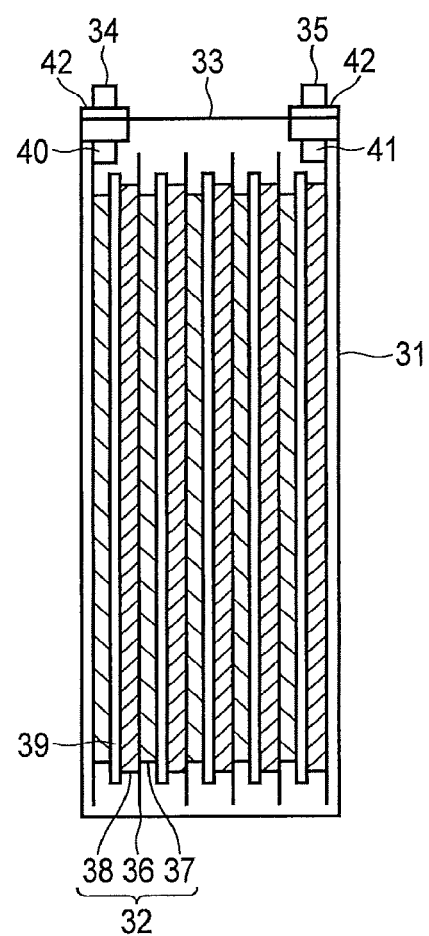
FIG. 6 is a sectional view showing an example of the secondary battery according to an embodiment.

FIG. 6 shows an example of a bipolar secondary battery. The secondary battery shown in FIG. 6 includes a metal container 31, an electrode body 32 having a bipolar structure, a sealing plate 33, a positive electrode terminal 34, and a negative electrode terminal 35. The metal container 31 has a bottomed square tubular shape. As the metal container, a metal container similar to that described above is usable. The electrode body 32 having the bipolar structure includes a current collector 36, a positive electrode layer (positive electrode active material-containing layer) 37 stacked on one surface (first surface) of the current collector 36, and a negative electrode layer (negative electrode active material-containing layer) 38 stacked on the other surface (second surface) of the current collector 36. A composite layer 39 is arranged between the electrode bodies 32 each having the bipolar structure. The positive electrode terminal 34 and the negative electrode terminal 35 are fixed to the sealing plate 33 via an insulating member 42. One end of a positive electrode lead 40 is electrically connected to the positive electrode terminal 34 and the other end is electrically connected to the current collector 36. One end of a negative electrode lead 41 is electrically connected to the negative electrode terminal 35 and the other end is electrically connected to the current collector 36.

Since the secondary battery according to the above-described second embodiment includes the electrode group according to the first embodiment, it is possible to obtain excellent charge-and-discharge cycle life, storage performance, and low-temperature performance.

Third Embodiment

A battery module according to the third embodiment includes a plurality of secondary batteries according to the second embodiment.

Examples of the battery module can include a battery module including a plurality of single batteries electrically connected in series and/or in parallel as constituent units, and a battery module including a first unit formed from a plurality of single batteries electrically connected in series or a second unit formed from a plurality of single batteries electrically connected in parallel. The battery module may include at least one of the forms.

Examples of the form in which secondary batteries are electrically connected in series and/or in parallel include a form in which batteries each including a container member are electrically connected in series and/or in parallel and a form in which electrode groups or bipolar electrode bodies stored in a common case are electrically connected in series and/or in parallel. As a detailed example of the former, the positive electrode terminals and the negative electrode terminals of secondary batteries are connected by bus bars made of a metal (for example, aluminum, nickel, or copper). As a detailed example of the latter, the electrode groups or bipolar electrode bodies are stored in one case in a state in which they are electrochemically insulated by partitions, and the electrode groups or bipolar electrode bodies are electrically connected in series. If secondary batteries are used, when the number of batteries electrically connected in series falls within the range of 5 to 7, satisfactory voltage compatibility with a lead storage battery can be obtained. To further improve the voltage compatibility with a lead storage battery, a structure including five or six single batteries connected in series is preferable.

As the case storing the battery module, a metal can made of an aluminum alloy, iron, stainless steel, or the like, a plastic container, or the like can be used. The plate thickness of the container is desirably 0.5 mm or more.

An example of a battery module will be described with reference to FIG. 7. A battery module 21 shown in FIG. 7 includes, as single batteries, a plurality of rectangular secondary batteries $22_1$ to $22_5$ shown in FIG. 2. A positive electrode tab 8 of the battery $22_1$ and a negative electrode tab 9 of the battery $22_2$ located adjacent to the battery $22_1$ are electrically connected by a lead or bus bar 23. In addition, a positive electrode tab 8 of the battery $22_2$ and a negative electrode tab 9 of the battery $22_3$ located adjacent to the battery $22_2$ are electrically connected by a lead or bus bar 23. The batteries $22_1$ to $22_5$ are thus electrically connected in series.

Since the battery module according to the above-described third embodiment includes the secondary batteries with the electrode groups according to the first embodiment, it is possible to obtain excellent charge-and-discharge cycle life, storage performance, and low-temperature performance.

Fourth Embodiment

A battery pack according to the fourth embodiment can include one or two or more secondary batteries (single batteries) according to the second embodiment. The plural secondary batteries can be electrically connected in series, in parallel, or in a combination of series connection and parallel connection, thereby forming a battery module. The battery pack according to the fourth embodiment may include plural battery modules.

The battery pack according to the fourth embodiment can further include a protective circuit. The protective circuit has a function of controlling charge/discharge of a secondary battery. Alternatively, a circuit included in a device (for example, an electronic device or an automobile) that uses a battery pack as a power supply can be used as the protective circuit of the battery pack.

The battery pack according to the fourth embodiment can further include an external power distribution terminal. The external power distribution terminal is configured to output a current from the secondary battery to the outside and input a current to the secondary battery. In other words, when the battery pack is used as a power supply, a current is supplied to the outside via the external power distribution terminal. Additionally, when charging the battery pack, a charge current (including regenerative energy of the power of a vehicle such as an automobile) is supplied to the battery pack via the external power distribution terminal.

Figure 8:
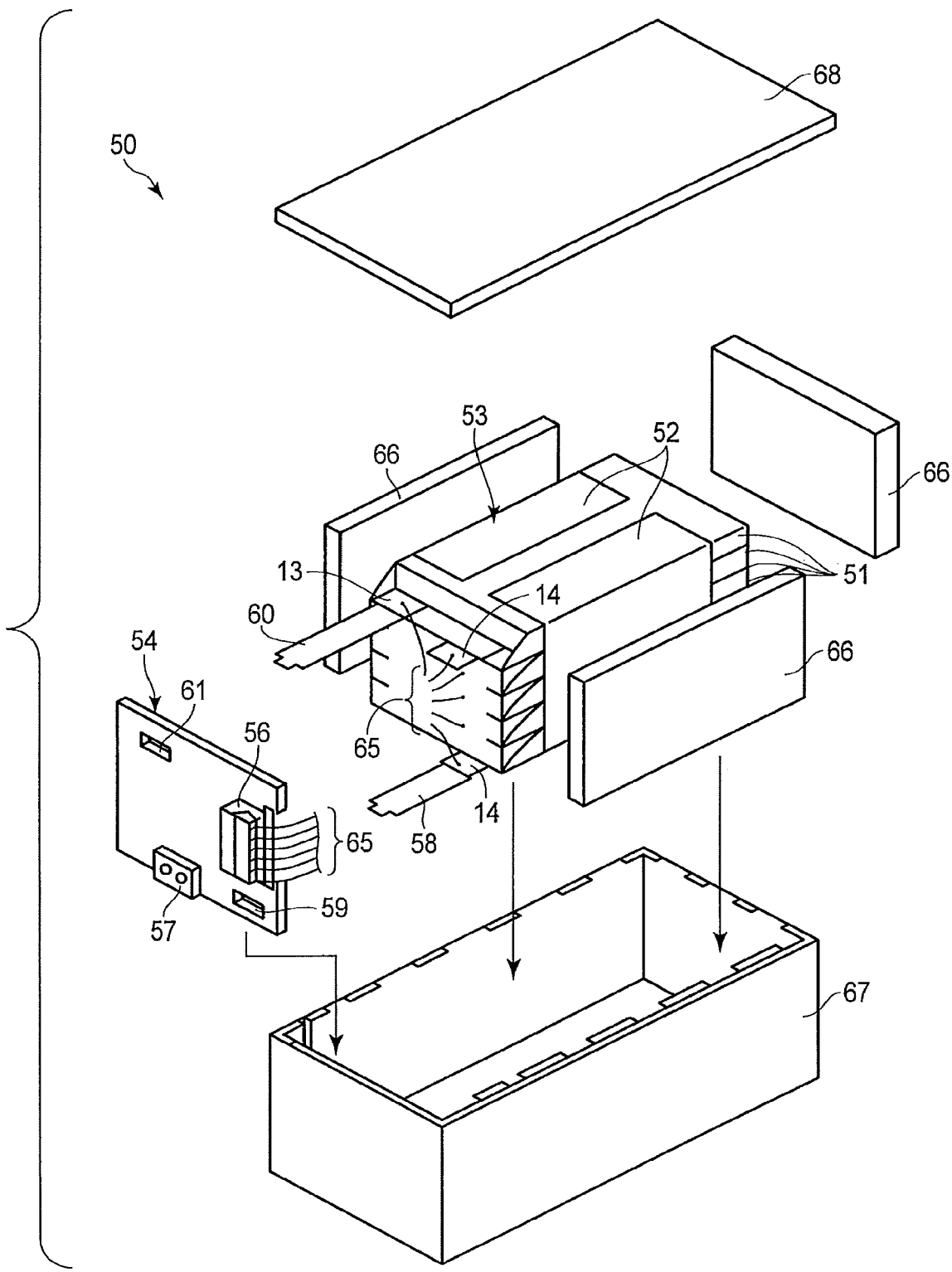
FIG. 8 is an exploded perspective view showing a battery pack according to an embodiment.
Figure 9:
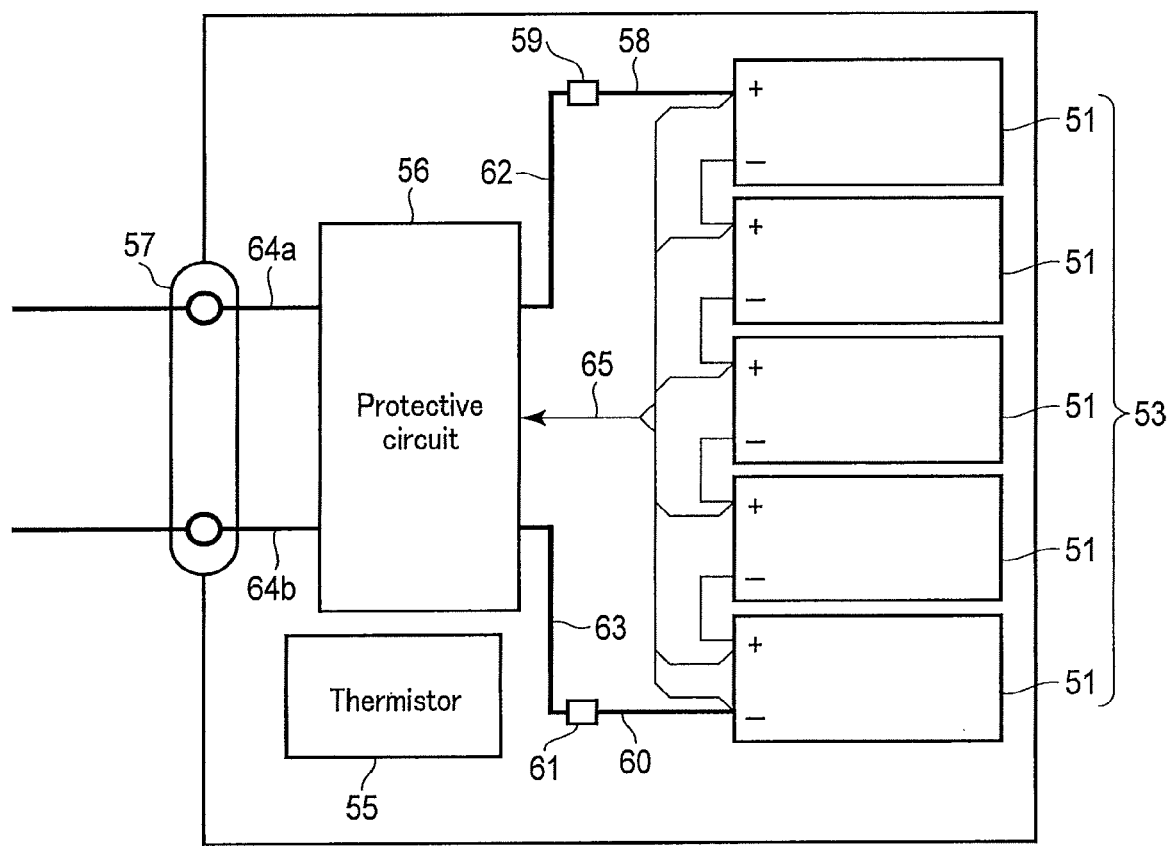
FIG. 9 is a block diagram showing the electric circuit of the battery pack shown in FIG. 8.

FIGS. 8 and 9 show an example of a battery pack 50. FIG. 8 is an exploded perspective view of an example of the battery pack 50. FIG. 9 is a block diagram showing an electric circuit of the battery pack 50.

The battery pack 50 shown in FIGS. 8 and 9 includes single batteries 51. The single batteries 51 are flat batteries described with reference to FIG. 4.

Plural single batteries 51 are stacked so that the negative electrode terminals 13 and the positive electrode terminals 14 extended outside are arranged in the same direction, and fastened with an adhesive tape 52 to configure a battery module 53. The single batteries 51 are electrically connected to each other in series as shown in FIG. 9.

A printed wiring board 54 is arranged to face opposite to the side plane of the single battery 51 where the negative electrode terminal 13 and the positive electrode terminal 14 extend out from. A thermistor 55, a protective circuit 56, and an energizing terminal 57 to an external device as the external power distribution terminal are mounted on the printed wiring board 54 as shown in FIG. 9. An electric insulating plate (not shown) is attached to the surface of the printed wiring board 54 facing the battery module 53 to avoid unnecessary connection of the wires of the battery module 53.

A positive electrode-side lead 58 is connected to the positive electrode terminal 14 located at the bottom layer of the battery module 53 and the distal end of the lead 58 is inserted into a positive electrode-side connector 59 of the printed wiring board 54 so as to be electrically connected. A negative electrode-side lead 60 is connected to the negative electrode terminal 13 located at the top layer of the battery module 53 and the distal end of the lead 60 is inserted into an negative electrode-side connector 61 of the printed wiring board 54 so as to be electrically connected. The connectors 59 and 61 are connected to the protective circuit 56 through wires 62 and 63 formed on the printed wiring board 54.

The thermistor 55 detects the temperature of the single batteries 51, and the detection signal is sent to the protective circuit 56. The protective circuit 56 can shut down a plus-side wire 64a and a minus-side wire 64b between the protective circuit 56 and the energizing terminal 57 to an external device under a predetermined condition. The predetermined condition indicates, for example, the case where the temperature detected by the thermistor 55 becomes a predetermined temperature or more. Another example of the predetermined condition indicates the case where the over-charge, over-discharge, or over-current of the single batteries 51 is detected. The detection of the over-charge and the like is performed on each of the single batteries 51 or the entire battery module 53. When each of the single batteries 51 is detected, the battery voltage may be detected, or a positive electrode or negative electrode potential may be detected. In the latter case, a lithium electrode to be used as a reference electrode is inserted into each of the single batteries 51. In the case of the battery pack of FIGS. 8 and 9, wires 65 for voltage detection are connected to each of the single batteries 51. Detection signals are sent to the protective circuit 56 through the wires 65.

Protective sheets 66 made of rubber or resin are arranged on three side planes of the battery module 53 except the side plane from which the positive electrode terminal 14 and the negative electrode terminal 13 protrude out from.

The battery module 53 is housed in a housing container 67 together with each of the protective sheets 66 and the printed wiring board 54. That is, the protective sheets 66 are arranged on both internal surfaces in a long side direction and on one internal surface in a short side direction of the housing container 67. The printed wiring board 54 is arranged on the internal surface on the opposite side in a short side direction. The battery module 53 is located in a space surrounded by the protective sheets 66 and the printed wiring board 54. A lid 68 is attached to the upper surface of the housing container 67.

In order to fix the battery module 53, a heat-shrinkable tape may be used in place of the adhesive tape 52. In this case, the battery module is bound by placing the protective sheets on the both sides of the battery module, revolving the heat-shrinkable tape, and thermally shrinking the heat-shrinkable tape.

In FIGS. 8 and 9, the form in which the single batteries 51 are connected in series is shown. However, in order to increase the battery capacity, the batteries may be connected in parallel. Alternatively, the batteries may be formed by combining series connection and parallel connection. The assembled battery pack can be connected in series or in parallel.

The battery pack shown in FIGS. 8 and 9 includes one battery module. The battery pack according to the fourth embodiment may include a plurality of battery modules. The plurality of battery modules are electrically connected in series, in parallel, or in a combination of series connection and parallel connection.

The form of the battery pack is appropriately changed in accordance with the application purpose. The battery pack according to this embodiment is preferably used for an application purpose requiring that excellent cycle performance is obtained at the time of extracting a large current. More specifically, the battery pack is used as a power supply for a digital camera, a battery for a vehicle such as a two- or four-wheeled hybrid electronic automobile, a two- or four-wheeled electronic automobile, an electric bicycle, or a railway vehicle (for example, an electric train), or a stationary battery. Especially, the battery pack is preferably used as an onboard battery mounted in a vehicle.

Since the battery pack according to the above-described fourth embodiment includes the secondary batteries with the electrode groups according to the first embodiment, it is possible to obtain excellent charge-and-discharge cycle life, storage performance, and low-temperature performance.

Fifth Embodiment

A vehicle according to the fifth embodiment includes one or two or more secondary batteries according to the second embodiment, the battery module according to the third embodiment, or the battery pack according to the fourth embodiment.

According to the fifth embodiment, in a vehicle such as an automobile in which the battery pack is mounted, the battery pack is configured to, for example, collect regenerative energy of the power of the vehicle. The vehicle may include a mechanism of converting the kinetic energy of the vehicle into regenerative energy.

Figure 10:
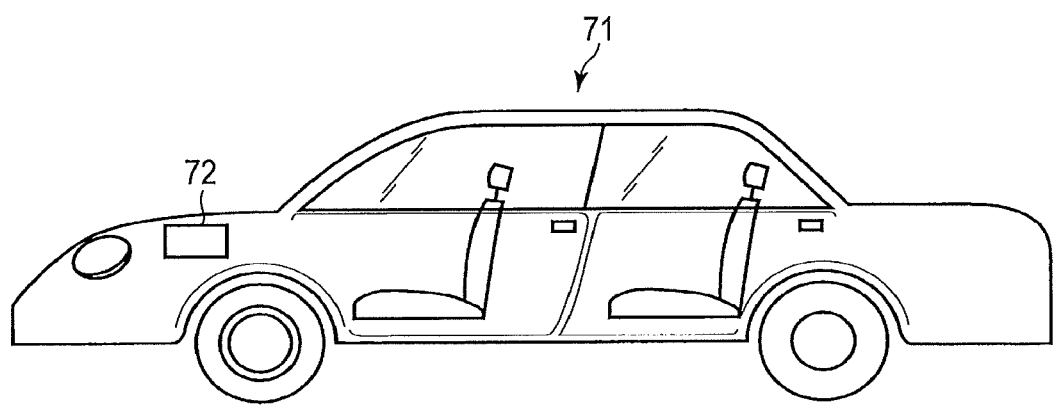
FIG. 10 is a schematic view showing an example of a vehicle in which a secondary battery is mounted according to an embodiment.

FIG. 10 shows an example of an automobile including a battery pack as an example according to the fourth embodiment.

An automobile 71 shown in FIG. 10 includes a battery pack 72 as an example according to the fourth embodiment, that is mounted in an engine room on the front side of the vehicle body. The mount position of the battery pack in the automobile is not limited to the engine room. For example, the battery pack can be mounted on the rear side of the vehicle body or under a seat of the automobile.

Figure 11:
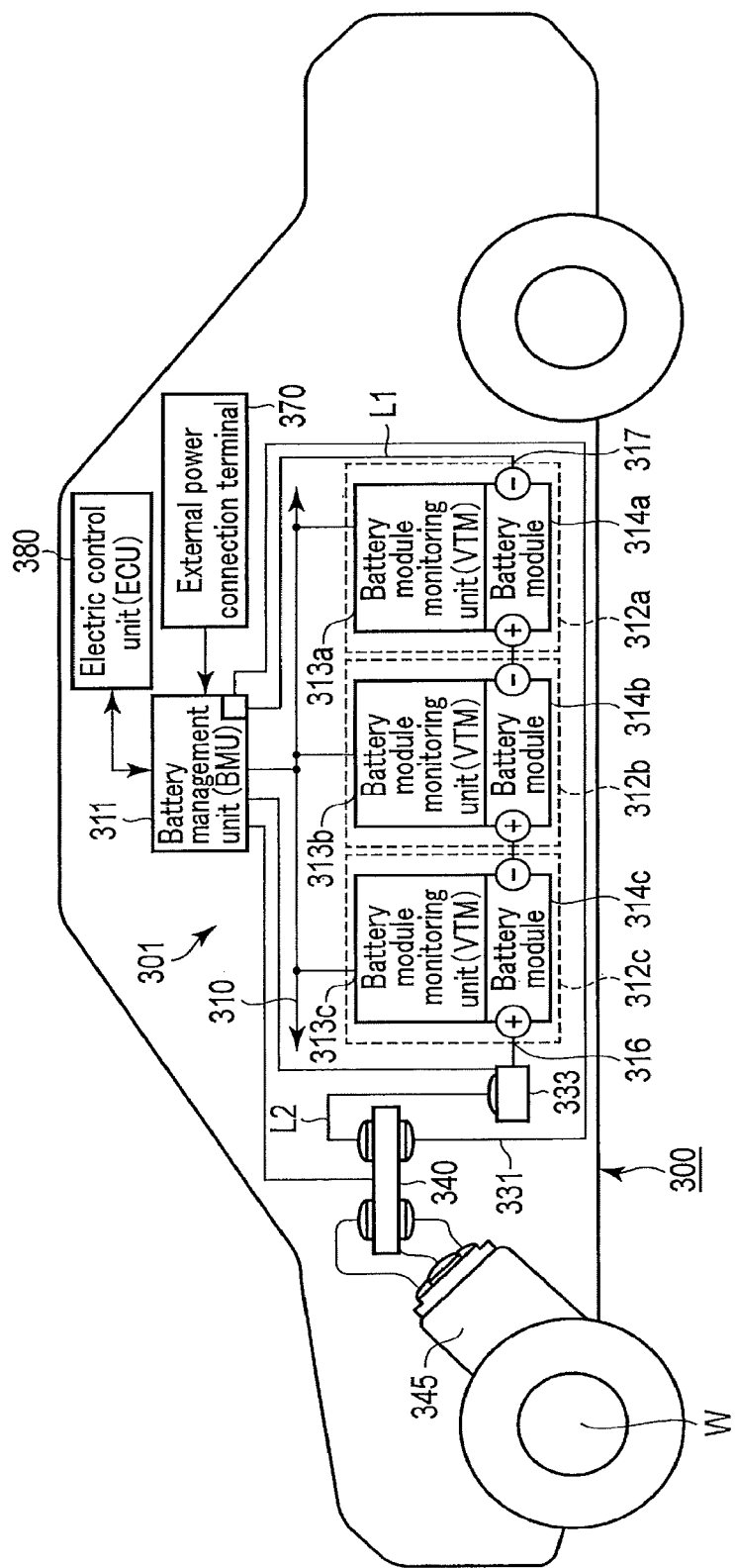
FIG. 11 is a view schematically showing another example of the vehicle according to the embodiment.

FIG. 11 is a view schematically showing the arrangement of an example of the vehicle according to the embodiment. A vehicle 300 shown in FIG. 11 is an electric automobile.

The vehicle 300, shown in FIG. 11, includes a vehicle body, a vehicle power source 301, a vehicle ECU (electric control unit) 380, which is a master controller of the vehicle power source 301, an external terminal (an external power connection terminal) 370, an inverter 340, and a drive motor 345.

The vehicle 300 includes the vehicle power source 301, for example, in the engine compartment, in the rear sections of the automobile body, or under a seat. In FIG. 11, the position of the vehicle power source 301 installed in the vehicle 300 is schematically shown.

The vehicle power source 301 includes plural (for example, three) battery packs 312a, 312b and 312c, BMU (a battery management unit) 311, and a communication bus 310.

The three battery packs 312a, 312b and 312c are electrically connected to each other in series. The battery pack 312a includes a battery module 314a and a battery module monitoring unit (VTM: voltage temperature monitoring) 313a. The battery pack 312b includes a battery module 314b, and a battery module monitoring unit 313b. The battery pack 312c includes a battery module 314c, and a battery module monitoring unit 313c. The battery packs 312a, 312b and 312c can each be independently removed, and may be exchanged by a different battery pack.

Each of the battery modules 314a to 314c includes plural single batteries connected to each other in series. At least one of the plural single batteries is the secondary battery according to the embodiment. The battery modules 314a to 314c each perform charging and discharging through a positive electrode terminal 316 and a negative electrode terminal 317.

In order to collect information concerning security of the vehicle power source 301, the battery management unit 311 performs communication with the battery module monitoring units 313a to 313c and collects information such as voltages or temperatures of the single batteries included in the battery modules 314a to 314c included in the vehicle power source 301.

The communication bus 310 is connected between the battery management unit 311 and the battery module monitoring units 313a to 313c. The communication bus 310 is configured so that multiple nodes (i.e., the battery management unit and one or more battery module monitoring units) share a set of communication lines. The communication bus 310 is, for example, a communication bus configured based on CAN (Control Area Network) standard.

The battery module monitoring units 313a to 313c measure a voltage and a temperature of each single battery in the battery modules 314a to 314c based on communications from the battery management unit 311. It is possible, however, to measure the temperatures only at several points per battery module, and the temperatures of all of the single batteries need not be measured.

The vehicle power source 301 may also have an electromagnetic contactor (for example, a switch unit 333 shown in FIG. 11) for switching connection between the positive electrode terminal and the negative electrode terminal. The switch unit 333 includes a precharge switch (not shown), which is turned on when the battery modules 314a to 314c are charged, and a main switch (not shown), which is turned on when battery output is supplied to a load. The precharge switch and the main switch include a relay circuit (not shown), which is turned on or off based on a signal supplied to a coil located near the switch element.

The inverter 340 converts an inputted DC (direct current) voltage to a three-phase AC (alternate current) high voltage for driving a motor. Three-phase output terminal(s) of the inverter 340 is connected to each three-phase input terminal of the drive motor 345. The inverter 340 controls an output voltage based on control signals from the battery management unit 311 or the vehicle ECU 380, which controls the whole operation of the vehicle.

The drive motor 345 is rotated by electric power supplied from the inverter 340. The rotation is transferred to an axle and driving wheels W, for example, through a differential gear unit.

The vehicle 300 also includes a regenerative brake mechanism, though not shown. The regenerative brake mechanism rotates the drive motor 345 when the vehicle 300 is braked, and converts kinetic energy into regenerative energy, as electric energy. The regenerative energy, recovered in the regenerative brake mechanism, is inputted into the inverter 340 and converted to direct current. The direct current is inputted into the vehicle power source 301.

One terminal of a connecting line L1 is connected through a current detector (not shown) in the battery management unit 311 to the negative electrode terminal 317 of the vehicle power source 301. The other terminal of the connecting line L1 is connected to a negative electrode input terminal of the inverter 340.

One terminal of a connecting line L2 is connected through the switch unit 333 to the positive electrode terminal 316 of the vehicle power source 301. The other terminal of the connecting line L2 is connected to a positive electrode input terminal of the inverter 340.

The external terminal 370 is connected to the battery management unit 311. The external terminal 370 is able to connect, for example, to an external power source.

The vehicle ECU 380 cooperatively controls the battery management unit 311 together with other units in response to inputs operated by a driver or the like, thereby performing the management of the whole vehicle. Data concerning the security of the vehicle power source 301, such as a remaining capacity of the vehicle power source 301, are transferred between the battery management unit 311 and the vehicle ECU 380 through communication lines.

The vehicle according to the fifth embodiment includes the battery pack with the secondary batteries according to the embodiment, and the battery pack (for example, the battery packs 312a, 312b, and 312c) has excellent charge-and-discharge cycle life, storage performance, and low-temperature performance. Therefore, a reliable vehicle having excellent charge-and-discharge performance can be obtained. In addition, each battery pack is inexpensive and safe. It is therefore possible to suppress the cost of the vehicle and increase the safety.

EXAMPLES

Examples of the present embodiments will be described in detail below with reference to the accompanying drawings. However, the present embodiments are not limited to the examples to be described below.

Example 1

Secondary particles of $LiNi_{0.8}Co_{0.1}Mn_{0.1}O_2$ having an average secondary particle size of 5 μm were prepared as positive electrode active material particles. 5 wt % of graphite powder serving as a conductive agent and 5 wt % of PVdF serving as a binder were mixed with 90 wt % of positive electrode active material particles. The obtained mixture was dispersed in an n-methylpyrolidone (NMP) solvent to prepare a slurry. After that, the obtained slurry was applied to both surfaces of a 15 μm-thick aluminum alloy foil (purity of 99%), dried, and pressed, thereby producing a positive electrode having an electrode density (the density of the positive electrode active material-containing layer) of 3 g/cm³. The thickness of one positive electrode active material-containing layer was 50 μm.

As negative electrode active material particles, particles of $TiNb_2O_7$ having a specific surface area of 10 m²/g in the BET method by $N_2$ adsorption were prepared. 95 wt % of secondary particles of $TiNb_2O_7$ and 5 wt % of carboxymethyl cellulose (CMC) were mixed, added to ethanol, ground using a ball mill, and uniformly mixed, and then underwent a heat treatment in a nitrogen atmosphere at 700° C. for 1 hour. Thus, a carbon material layer was formed on the surfaces and inside of the secondary particles of $TiNb_2O_7$, thereby obtaining a negative electrode active material. The content of a carbon material in the negative electrode active material was 1 wt %. The average primary particle size of the negative electrode active material was 1 μm, and the average secondary particle size was 10 μm.

The negative electrode active material particles, the graphite powder having an average particle size of 6 μm and serving as a conductive agent, and PVdF serving as a binder were mixed at a weight ratio of 95:3:2 and dispersed in an n-methylpyrolidone (NMP) solvent. The mixture was stirred using a ball mill at a rotational speed of 1,000 rpm for a stirring time of 2 hours to prepare a slurry. The obtained slurry was applied to a 15 μm-thick aluminum alloy foil (purity of 99.3%), dried, and heat-pressed, thereby producing a negative electrode having an electrode density (the density of the negative electrode active material-containing layer) of 2.8 g/cm³. The thickness of one negative electrode active material-containing layer was 55 μm.

An aqueous solution obtained by dispersing 14.9 wt % of particles of $Li_{1.3}Al_{0.3}Zr_{1.7}(PO_4)_3$ having a BET specific surface area of 15 m²/g by $N_2$ adsorption and an average primary particle size (diameter) of 0.5 μm and 0.1 wt % of cellulose nanofiber having an average fiber diameter of 10 nm was applied to one principal surface of the positive electrode active material-containing layer, and dried, thereby obtaining a precursor layer.

On the other hand, a layer of polymer fibers was formed on the principal surface of the negative electrode active material-containing layer by the electrospinning method. As a polymeric material, aramid was used. Aramid was dissolved in dimethylacetamide as a solvent at a concentration of 20 mass %, thereby preparing a raw material solution. The obtained raw material solution was supplied from a spinning nozzle to the principal surface of the negative electrode active material-containing layer using a metering pump at a supply speed of 5 μl/min. A voltage of 20 kV was applied to the spinning nozzle using a high-voltage generator, thereby forming the layer of polymer fibers while moving the one spinning nozzle. The aramid fibers have an average fiber diameter of 0.3 μm and an average layer thickness of 3 μm. The porosity of a porous layer was 70%.

An electrode group was obtained by stacking the positive electrode and the negative electrode so that the precursor layer and porous layer interpose between the positive electrode active material-containing layer and the negative electrode active material-containing layer, and spirally winding the stacked structure in a flat shape. The obtained electrode group was stored in a thin metal can having a thickness of 0.25 mm and made of an aluminum alloy (Al purity of 99%).

$LiPF_6$ was dissolved, at a concentration of 1 M, in a solvent obtained by mixing propylene carbonate (PC) and diethyl carbonate (DEC) at a volume ratio of PC:DEC=1:2, thereby obtaining a liquid nonaqueous electrolyte. 80 wt % of the liquid nonaqueous electrolyte and 20 wt % of a polymer containing polyacrylonitrile (PAN) were mixed. The obtained mixed solution was injected into the metal can to permeate the pores of the electrode group. After that, a heat treatment was performed at 60° C. for 24 hours, thereby forming a 10 μm-thick gel composite layer. In the composite layer, a thickness A of the porous layer and a thickness B of a lithium ion conductive layer are shown in Table 1 below. In the lithium ion conductive layer, the weight ratio of particles of $Li_{1.3}Al_{0.3}Zr_{1.7}(PO_4)_3$, a gel of polymer containing a nonaqueous electrolytic solution and a polymer solution of polyacrylonitrile (PAN), and cellulose nanofiber was 93:4:3. Therefore, the content of the lithium-containing inorganic particles in the lithium ion conductive layer was 93 wt %, and the content of the polymer fibers was 3 wt %.

By performing the above steps, a rectangular nonaqueous electrolyte secondary battery having the structure shown in FIG. 2 and having a thickness of 13 mm, a width of 62 mm, and a height of 96 mm was obtained.

Examples 2 to 13

A nonaqueous electrolyte secondary battery was produced in accordance with the same procedure as in Example 1 except that a negative electrode active material, lithium-containing inorganic particles, a porous layer, the thickness (A) of the porous layer, the thickness (B) of a lithium ion conductive layer, and B/A were changed as shown in Tables 1 and 2 below.

Note that as particles of $Li_4Ti_5O_{12}$, particles having a spinel structure and an average primary particle diameter of 0.5 μm were used. As particles of $Li_2Na_{1.5}Ti_{5.5}Nb_{0.5}O_{14}$, particles having an orthorhombic structure and an average primary particle diameter of 1 μm were used. As the porous layer made of cellulose fiber, nonwoven fabric made of cellulose fiber having a thickness of 10 μm and a porosity of 70% was used. As the polyethylene film, a polyethylene film having a thickness of 10 μm and a porosity of 55% was used.

Example 14

In the manufacturing process of the first embodiment, only a liquid nonaqueous electrolyte was injected into a metal can, instead of the mixed solution injected into the electrode group in the metal can. After that, a nonaqueous electrolyte secondary battery having the same size as in the first embodiment was produced by sealing the metal can without performing a heat treatment. A composite layer in the obtained secondary battery was obtained by holding the liquid electrolyte in a lithium ion conductive layer and a porous layer. The thickness (A) of the porous layer, the thickness (B) of the lithium ion conductive layer, and B/A in the composite layer are shown in Table 1 below.

Comparative Example 1

A precursor of a 15 μm-thick lithium ion conductive layer was formed on the surface of a positive electrode active material-containing layer in accordance with the same procedure as in Example 1. An electrode group was obtained by stacking a positive electrode and a negative electrode so that the precursor interposes between the positive electrode active material-containing layer and a negative electrode active material-containing layer, and spirally winding the stacked structure in a flat shape. The obtained electrode group was stored in a thin metal can having a thickness of 0.25 mm and made of an aluminum alloy (Al purity of 99%). A mixed solution, having the same composition as in Example 1, of a liquid nonaqueous electrolyte and a polymer solution of polyacrylonitrile (PAN) was injected into the metal can to permeate the pores of the electrode group. After that, a heat treatment was performed at 60° C. for 24 hours, thereby forming a 15 μm-thick gel lithium ion conductive layer.

By performing the above steps, a nonaqueous electrolyte secondary battery having the same size as in Example 1 was produced.

Comparative Example 2

A 10 μm-thick porous layer made of aramid fibers was formed on the surface of a negative electrode active material-containing layer in accordance with the same procedure as in Example 1. An electrode group was obtained by stacking a positive electrode and a negative electrode so that the porous layer interposes between a positive electrode active material-containing layer and the negative electrode active material-containing layer, and spirally winding the stacked structure in a flat shape. The obtained electrode group was stored in a thin metal can having a thickness of 0.25 mm and made of an aluminum alloy (Al purity of 99%).

A mixed solution, having the same composition as in Example 1, of a liquid nonaqueous electrolyte and a polymer solution of polyacrylonitrile (PAN) was injected into the metal can to permeate the pores of the electrode group. After that, a heat treatment was performed at 60° C. for 24 hours, thereby forming a 10 μm-thick gel porous layer.

By performing the above steps, a nonaqueous electrolyte secondary battery having the same size as in Example 1 was produced.

Comparative Examples 3 and 4

As a porous layer, a polyethylene film having a thickness of 20 μm and a porosity of 50% was prepared. An electrode group was obtained by stacking a positive electrode and a negative electrode so that the porous layer interposes between a positive electrode active material-containing layer and a negative electrode active material-containing layer, and spirally winding the stacked structure in a flat shape. The obtained electrode group was stored in a thin metal can having a thickness of 0.25 mm and made of an aluminum alloy (Al purity of 99%).

A mixed solution, having the same composition as in Example 1, of a liquid nonaqueous electrolyte and a polymer solution of polyacrylonitrile (PAN) was injected into the metal can to permeate the pores of the electrode group. After that, a heat treatment was performed at 60° C. for 24 hours, thereby forming a 15 μm-thick gel porous layer.

By performing the above steps, a nonaqueous electrolyte secondary battery having the same size as in Example 1 was produced. Note that as a negative electrode active material according to Comparative Example 3, the same material as in Example 1 was used. As a negative electrode active material according to Comparative Example 4, the same material as in Examples 9 and 10 was used.

Comparative Example 5

A precursor of a 7 μm-thick lithium ion conductive layer was formed on the surface of a negative electrode active material-containing layer in accordance with the same procedure as in Example 1. Furthermore, a 3 μm-thick porous layer made of aramid fibers was formed on the surface of a positive electrode active material-containing layer in accordance with the same procedure as in Example 1. An electrode group was obtained by stacking a positive electrode and a negative electrode so that the porous layer and the precursor interposes between the positive electrode active material-containing layer and the negative electrode active material-containing layer, and spirally winding the stacked structure in a flat shape. The obtained electrode group was stored in a thin metal can having a thickness of 0.25 mm and made of an aluminum alloy (Al purity of 99%).

A mixed solution, having the same composition as in Example 1, of a liquid nonaqueous electrolyte and a polymer solution of polyacrylonitrile (PAN) was injected into the metal can to permeate the pores of the electrode group. After that, a heat treatment was performed at 60° C. for 24 hours, thereby forming a 15 μm-thick gel lithium ion conductive layer.

By performing the above steps, a nonaqueous electrolyte secondary battery having the same size as in Example 1 was produced.

Each of the obtained secondary batteries according to the examples and comparative examples was charged up to 2.9 V at 25° C. with a constant current of 6 A, and then charged with a constant voltage of 2.9 V. When the current value reached 0.05 A, charging ended. Subsequently, the discharge capacity at the time of discharging to 1.5 V with 6 A was measured as a discharge capacity at 25° C.

As the charge-and-discharge cycle performance, the following test was conducted. A secondary battery was charged up to 2.9 V with a constant current of 6 A, and then charged with a constant voltage of 2.9 V. When the current value reached 0.05 A, charging ended. Subsequently, the secondary battery was discharged to 1.5 V with 6 A. This charge-and-discharge cycle was repeated at 35° C. The number of cycles until the discharge capacity reached 80% of the initial capacity was measured. The number of cycles is shown in Table 3 as a cycle life.

As the storage performance (self-discharge performance), a remaining capacity at 60° C. after one month was measured. After fully charging the secondary battery up to 2.9 V, the secondary battery was left for one month under a 60° C. environment, and discharged to 1.5 V with 1.2 A. Then, the discharge capacity was measured. Defining a discharge capacity before storage at 60° C. as 100%, the obtained discharge capacity is set as the remaining capacity at 60° C. after one month.

As the low-temperature discharge performance, the secondary battery was charged up to 2.9 V with a constant current of 6 A at 25° C., and then charged with a constant voltage of 2.9 V. When the current value reached 0.05 A, charging ended. Subsequently, the capacity retention ratio at the time of discharging with 1.2 A at −20° C. was measured. The capacity retention ratio was calculated by defining a discharge capacity at 25° C. as 100%.

These measurement results are shown in Table 3 below.

TABLE 1

|  | Negative electrode active material | Lithium-containing inorganic particle on surface of positive electrode | Porous layer on surface of negative electrode | Thickness A (μm) | Thickness B (μm) | B/A |
|---|---|---|---|---|---|---|
| Example 1 | $TiNb_2O_7$ | $Li_{1.3}Al_{0.3}Zr_{1.7}(PO_4)_3$ | Aramid fiber | 3 | 7 | 2.33 |
| Example 2 | $TiNb_2O_7$ | $Li_{1.3}Al_{0.3}Zr_{1.7}(PO_4)_3$ | Aramid fiber | 5 | 5 | 1 |
| Example 3 | $TiNb_2O_7$ | $Li_{1.3}Al_{0.3}Zr_{1.7}(PO_4)_3$ | Aramid fiber | 2 | 8 | 4 |
| Example 4 | $TiNb_2O_7$ | $Li_{1.3}Al_{0.3}Zr_{1.7}(PO_4)_3$ | Aramid fiber | 1 | 9 | 9 |
| Example 5 | $TiNb_2O_7$ | $Li_{1.3}Al_{0.3}Zr_{1.7}(PO_4)_3$ | Aramid fiber | 1 | 10 | 10 |
| Example 6 | $TiNb_2O_7$ | $Li_{1.3}Al_{0.3}Zr_{1.7}(PO_4)_3$ | Aramid fiber | 6 | 3 | 0.5 |
| Example 7 | $TiNb_2O_7$ | $Li_{1.3}Al_{0.3}Zr_{1.7}(PO_4)_3$ | Cellulose fiber | 3 | 7 | 2.33 |
| Example 8 | $TiNb_2O_7$ | $Li_{1.3}Al_{0.3}Zr_{1.7}(PO_4)_3$ | Polyethylene film | 5 | 5 | 1 |
| Example 9 | $Li_4Ti_5O_{12}$ | $Li_{1.3}Al_{0.3}Zr_{1.7}(PO_4)_3$ | Aramid fiber | 3 | 7 | 2.33 |
| Example 10 | $Li_4Ti_5O_{12}$ | $Li_{1.3}Al_{0.3}Zr_{1.7}(PO_4)_3$ | Aramid fiber | 1 | 9 | 9 |
| Example 11 | $Li_2Na_{1.5}Ti_{5.5}Nb_{0.5}O_{14}$ | $Li_{1.3}Al_{0.3}Zr_{1.7}(PO_4)_3$ | Aramid fiber | 3 | 7 | 2.33 |
| Example 12 | $TiNb_2O_7$ | $Li_{1.3}Al_{0.3}Zr_{1.7}(PO_4)_3$ | Aramid fiber | 1 | 13 | 13 |
| Example 13 | $TiNb_2O_7$ | $Li_{1.2}Ca_{0.1}Zr_{1.9}(PO_4)_3$ | Aramid fiber | 3 | 7 | 2.33 |
| Example 14 | $TiNb_2O_7$ | $Li_{1.3}Al_{0.3}Zr_{1.7}(PO_4)_3$ | Aramid fiber | 3 | 7 | 2.33 |

TABLE 2

|  | Negative electrode active material | Lithium-containing inorganic particle on surface of positive electrode | Porous layer on surface of negative electrode | Thickness A (μm) | Thickness B (μm) | B/A |
|---|---|---|---|---|---|---|
| Comparative Example 1 | $TiNb_2O_7$ | $Li_{1.3}Al_{0.3}Zr_{1.7}(PO_4)_3$ | — | 0 | 15 | — |
| Comparative Example 2 | $TiNb_2O_7$ | — | Aramid fiber | 10 | 0 | — |
| Comparative Example 3 | $TiNb_2O_7$ | — | Polyethylene film | 15 | 0 | — |
| Comparative Example 4 | $Li_4Ti_5O_{12}$ | — | Polyethylene film | 15 | 0 | — |
| Comparative Example 5 | $TiNb_2O_7$ | Aramid fiber | $Li_{1.3}Al_{0.3}Zr_{1.7}(PO_4)_3$ | — | — | — |

TABLE 3

| | Discharge capacity (Ah) at 25° C. | Remaining capacity (%) at 60° C. after one month | Cycle life (number of times) at 35° C. | Discharge capacity retention ratio (%) at −20° C. |
|---|---|---|---|---|
| Example 1 | 6.6 | 80 | 6000 | 80 |
| Example 2 | 6.6 | 82 | 6000 | 75 |
| Example 3 | 6.6 | 75 | 5000 | 80 |
| Example 4 | 6.6 | 70 | 5000 | 85 |
| Example 5 | 6.5 | 70 | 5000 | 83 |
| Example 6 | 6.4 | 80 | 6000 | 70 |
| Example 7 | 6.3 | 85 | 4000 | 60 |
| Example 8 | 6.0 | 92 | 8000 | 85 |
| Example 9 | 6.0 | 80 | 8000 | 90 |
| Example 10 | 5.5 | 80 | 6000 | 80 |
| Example 11 | 4.5 | 70 | 4000 | 60 |
| Example 12 | 6.3 | 55 | 4000 | 65 |
| Example 13 | 6.4 | 80 | 6000 | 85 |
| Example 14 | 6.4 | 80 | 5000 | 70 |
| Comparative Example 1 | 6.5 | 50 | 4000 | 55 |
| Comparative Example 2 | 6.4 | 60 | 4500 | 60 |
| Comparative Example 3 | 6.4 | 70 | 4500 | 50 |
| Comparative Example 4 | 5.7 | 65 | 6000 | 65 |
| Comparative Example 5 | 6.0 | 50 | 3000 | 50 |

As is apparent from Tables 1 to 3, Examples 1 to 14 are more excellent in balance among the cycle life performance, storage performance, and low-temperature discharge performance, as compared to Comparative Examples 1 to 5. As can be seen from comparison between Examples 1 to 11 and Example 12, Examples 1 to 11 satisfying 0.5≤B/A≤10 given by inequality (1) are more excellent in remaining capacity at 60° C. after one month and discharge capacity retention ratio at −20° C., as compared to Example 12 satisfying no inequality (1).

As described in Comparative Example 5, if the porous layer covers the surface of the positive electrode active material-containing layer, and the lithium ion conductive layer containing lithium-containing inorganic particles covers the surface of the negative electrode active material-containing layer, the cycle life at 35° C. and the discharge capacity retention ratio at −20° C. are poor, as compared to the examples. The reason for this is estimated that the resistance of the electrode group becomes high.

As can be seen from comparison between Examples 1 and 14, Example 1 including the gel electrolyte is more excellent in cycle life at 35° C. and discharge capacity retention ratio at −20° C., as compared to Example 14 using the liquid electrolyte.

In the electrode group according to at least one of the embodiments or examples, the positive electrode active material-containing layer and the negative electrode active material-containing layer face each other via the porous layer and the lithium ion conductive layer containing lithium-containing inorganic particles, and it is therefore possible to decrease the lithium ion conduction resistance and improve the charge-and-discharge cycle life, low-temperature performance, and storage performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A nonaqueous electrolyte secondary battery comprising a nonaqueous electrolyte and an electrode group comprising:
    a positive electrode active material-containing layer;
    a negative electrode active material-containing layer;
    a lithium ion conductive layer containing lithium-containing inorganic particles and covering at least part of the positive electrode active material-containing layer; and
    a porous layer directly formed on at least one principal surface of the negative electrode active material-containing layer,
    wherein the positive electrode active material-containing layer and the negative electrode active material-containing layer face each other via the lithium ion conductive layer and the porous layer,
    the porous layer consists of a liquid electrolyte or gel electrolyte, wherein said liquid electrolyte or gel electrolyte comprises a lithium ion-containing organic electrolytic solution, and polymer fibers having an average fiber diameter of 0.05 μm to 10 μm, and
    the lithium ion conductive layer contains no second polymer fibers, or 5 wt % or less of the second polymer fibers.

2. The secondary battery of claim 1, wherein the electrode group satisfies $$0.5 \leq B/A \leq 10 \tag{1}$$

where A represents a thickness (μm) of the porous layer and B represents a thickness (μm) of the lithium ion conductive layer.

3. The secondary battery of claim 1, wherein the lithium ion conductive layer contains the second polymer fibers, a content of the second polymer fibers in the lithium ion conductive layer is from 0.1 wt % to 5 wt %, and the second polymer fibers of the lithium ion conductive layer have an average fiber diameter of 1 nm to 100 nm.

4. The secondary battery of claim 1, wherein the gel electrolyte contains the lithium ion-containing organic electrolytic solution and a polymer.

5. The secondary battery of claim 1, wherein a specific surface area of the lithium-containing inorganic particles in a BET adsorption method by $N_2$ ranges from 5 $m^2/g$ to 500 $m^2/g$.

6. The secondary battery of claim 1, wherein the negative electrode active material-containing layer contains a titanium-containing oxide.

7. The secondary battery of claim 6, wherein the titanium-containing oxide includes at least one material selected from the group consisting of a lithium titanium oxide having a spinel structure, a monoclinic titanium oxide, and a niobium titanium oxide.

8. A battery pack comprising at least one secondary battery defined by claim 1.

9. The battery pack of claim 8, further comprising:
    an external power distribution terminal; and
    a protective circuit.

10. The battery pack of claim 8, wherein
    the at least one secondary battery comprises at least two secondary batteries, and the at least two secondary batteries are electrically connected in series, in parallel, or in a combination of series connection and parallel connection.

11. A vehicle comprising a battery pack defined by claim 8.

12. The vehicle of claim 11, further comprising a mechanism configured to convert kinetic energy of the vehicle into regenerative energy.

13. The secondary battery of claim 1, wherein the lithium ion conductive layer and the porous layer are in contact with each other.

14. The secondary battery of claim 1, wherein the polymer fibers of the porous layer comprise at least one selected from the group consisting of aramid fibers and cellulose fibers.

15. The secondary battery of claim 1, wherein the average fiber diameter of the polymer fibers of the porous layer ranges from 0.2 µm to 1 µm.

16. The secondary battery of claim 1, wherein the polymer fibers of the porous layer comprise at least one selected from the group consisting of aramid, polyamide imide, polyamide, polyether, polyimide, polyketone, polysulfone, cellulose, and polyvinyl alcohol.

17. The secondary battery of claim 1, wherein the porous layer is produced by an electrospinning method.

18. The secondary battery of claim 1, wherein a content of the lithium-containing inorganic particles in the lithium ion conductive layer falls within a range of 80 wt % or more.

19. The secondary battery of claim 1, wherein the porous layer has a porous structure in which the polymer fibers are two- or three-dimensionally arranged.

\* \* \* \* \*